United States Patent [19]

Ban et al.

[11] 4,404,485

[45] Sep. 13, 1983

[54] DIRECT CURRENT MOTOR

[76] Inventors: Itsuki Ban, 829, Higashi-Oizumimach, Nerima-ku, Tokyo; Manabu Shiraki, 4451-171 Shimotsuruma, Yamato-shi, Kanagawa-ken; Kazuhito Egami, 2-44-1 Chuo, Nakano-ku, Tokyo, all of Japan

[21] Appl. No.: 273,328

[22] Filed: Jun. 15, 1981

[51] Int. Cl.[1] .............................................. H02K 13/14
[52] U.S. Cl. ................................. 310/198; 310/207; 310/234; 318/439
[58] Field of Search ............... 310/198, 202, 234, 154, 310/268, 68 B, 46, 207; 318/439

[56] References Cited

U.S. PATENT DOCUMENTS

| | | | |
|---|---|---|---|
| Re. 30,761 | 10/1981 | Ban et al. | 318/439 |
| 3,535,573 | 10/1970 | Appleton et al. | 310/234 |
| 3,686,521 | 8/1972 | Henry-Baudot | 310/46 |
| 4,242,608 | 12/1980 | Ishigaki et al. | 310/68 R |
| 4,315,178 | 2/1982 | Ban et al. | 310/154 |

Primary Examiner—J. D. Miller
Assistant Examiner—D. Rebsch
Attorney, Agent, or Firm—Kenway & Jenney

[57] ABSTRACT

A direct current motor comprising a field magnet provided with 2n magnetic poles which are magnetized with the same angular intervals as those of the magnetic poles N and S, where n is an integer of 1 or more; a magnetic member for closing the magnetic circuit of the magnetic poles of the field magnet; a plurality of armature coils in such a manner that the angular intervals of the electrically conductive portions thereof, contributing to the generation of torque in the armature coils, are substantially equal to the magnetic pole width of the field magnet; electric power supply control device to which the terminals of the armature coils are connected; short-circuit members for short-circuiting the winding initiation terminals of predetermined armature coils and the winding end terminals of other predetermined armature coils through the electric power supply control device; an armature comprising armature coils in the first series and armature coils in the second series through which the short-circuit members and the plurality of armature coils are connected in parallel to the positive pole and negative pole of a DC power source, the armature positioned so as to face the field magnet; and a rotating shaft for rotatably supporting the armature or the filed magnet, the rotating shaft rotatably supported by bearings disposed on an outer casing of the direct current motor.

1 Claim, 36 Drawing Figures

DIRECT CURRENT MOTOR

BACKGROUND OF THE INVENTION

The present invention relates to a direct current motor and more particularly to a direct current motor which is improved with respect to commutating characteristics, by use of short-circuit means capable of short-circuiting a predetermined number of armature coils which constitute a wave winding type armature, whereby the armature is reduced in thickness and formed in a disc- or cylindrical shape.

It is well known that a direct current (DC) motor, provided with a plurality of armature coils formed in a lap winding manner or a wave winding manner is highly efficient and has better commutating characteristics as the number of armature coils increases. However if the conventional manner of lap winding or wave winding is employed in a coreless motor, the armature will increase in thickness because the armature coils are superimposed on each other in many layers. The increased thickness of the armature will substantially reduce the effective magnetic field of the field magnet which passes through the armature, resulting in decreased magnetic field, motor efficiency and starting torque. In order to solve these problems, the prior art effort has been directed to decreasing the thickness of the conductor portions contributing to the generation of torque. This process for decreasing the thickness of the conductor portions is performed by press molding, and accordingly is often accompanied by such defects as breaking and short-circuiting of the armature coils. Further, since the phase relationship between the armature coils cannot be positively held in the desired state at the time the coils are arranged, correct phase relationship between the windings is liable to be distorted. Accordingly, such prior art DC motors are costly and cannot be mass produced.

Another prior art technique used for conventional cylindrical coreless DC motors, for avoiding superimposition of the opposite edge portions of the armature coils on each other, requires that the insulated wire be wound in alignment, turn by turn, alternatingly at an angle of about 180°, so that a cylindrical armature is formed, with the entire width of winding, or a part thereof slanting with respect to the rotating axis. This technique, however, also is costly and cannot be used for mass-production.

SUMMARY OF THE INVENTION

The above-described drawbacks in the prior art motors have been successfully eliminated by the present invention.

A primary object of the present invention is to provide a DC motor with high efficiency, which is simplified in construction and suitable for mass production and inexpensive.

Another object of the present invention is to provide a DC motor of the type described above, in which the number of armature coils is decreased by use of short-circuiting means capable of short-circuiting the winding initiation terminals of a predetermined number of armature coils and the winding end terminal of a predetermined number of armature coils, which armature coils constitute a wave winding type armature, and the peripheral portions of the armatures do not require any specific processing and the armature is reduced in thickness.

These and other objects of the present invention will become apparent from the following description of embodiments thereof when taken together with the drawings.

BRIEF DESCRIPTION OF THE DRAWINGS

In the drawings,

FIGS. 7(*b*), 7(*c*), 7(*d*), 7(*e*) and 7(*f*) are respectively explanatory views of armatures for use in the examples in FIGS. 2, 3, 4(*a*), 5 and 6.

FIGS. 17(*b*), 17(*c*), 17(*d*), 17(*e*), 17(*f*) and 17(*g*) are respectively explanatory views of armatures for use in the examples in FIGS. 8, 9, 10, 11, 14 and 16.

FIGS. 20(*b*) and 20(*c*) are respectively explanatory views of armatures for use in the examples in FIGS. 18 and 19.

DETAILED DESCRIPTION OF THE PREFERRED EMBODIMENTS

Figure 1:
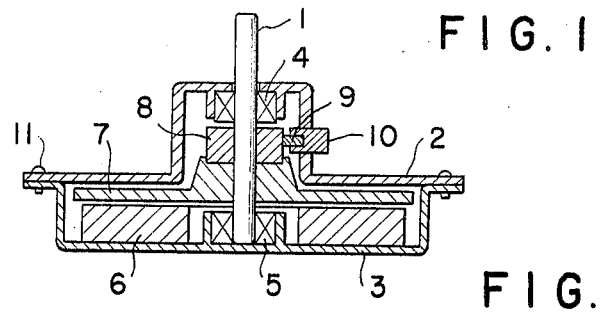
FIG. 1 is a sectional view of a commutator motor according to the present invention.

FIG. 1 is a sectional view of a commutator motor with a disc-shaped commutator. In the figure, a bearing 5 is fixed to a casing 3 made of press-formed soft steel. Further, a casing 2 made of press-formed soft steel is secured to the casing 3 by screws 11, forming a magnetic circuit therebetween. A bearing 4 is fixed to the casing 2. A rotating shaft 1 is supported by the bearings 4 and 5. One end of the rotating shaft 1 is in pressure contact with the casing 3. A cylindrical field magnet 6, magnetized with magnetic poles N and S located in the axial direction of the rotating shaft 1, is secured to the casing 3. To the rotating shaft 1, there are fixed an armature 7 and a commutator 8 which are molded integrally. The armature 7 is located in a field air gap between the casing 2 and the field magnet 6. Reference numeral 10 indicates a brush support for supporting brushes 9 which are in contact with the commutator 8.

Referring to FIGS. 2 to 20(*c*), there are shown expanded views of examples of armature coils for use in the above-mentioned commutator motor according to the present invention and explanatory views of field magnets and armatures employed in those examples.

Figure 5:
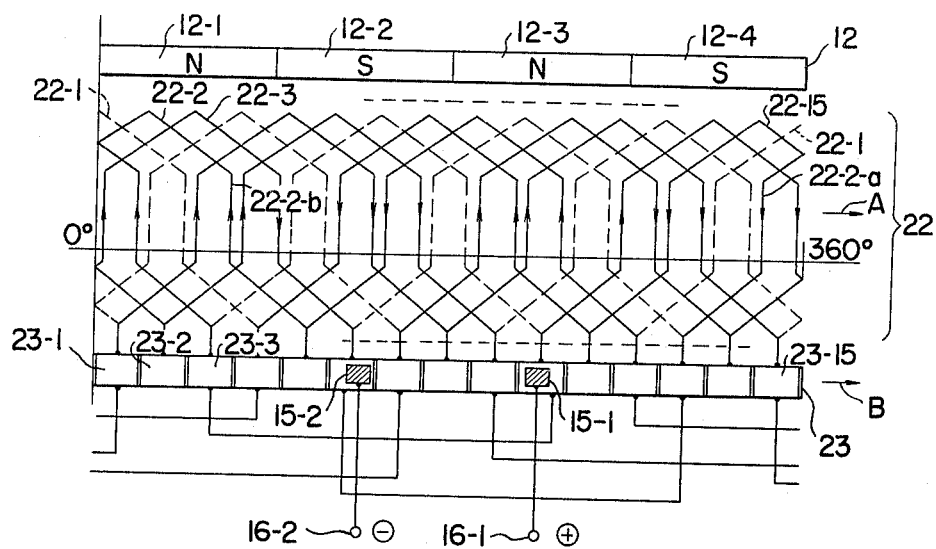
Figure 6:
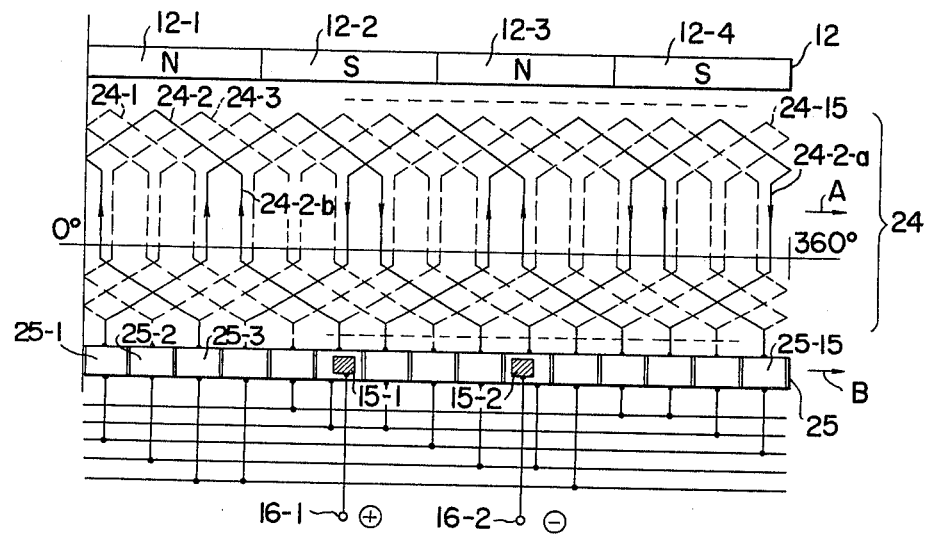
Figure 7A:
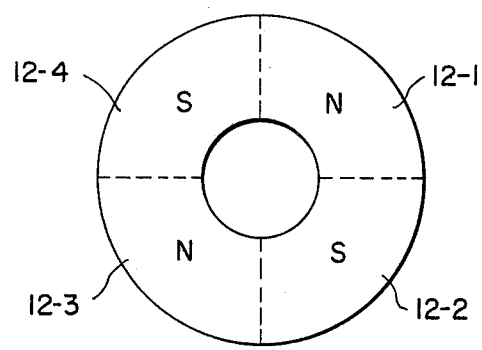
FIG. 7(*a*) is an explanatory view of the field magnet for use in the examples in FIGS. 2 to 6.

In FIGS. 2 to 6, the field magnet corresponding to the field magnet 6 as shown in FIG. 1 is a field magnet 12 with magnetic poles 12-1, 12-2, 12-3, and 12-4, magnetized alternately to N and S with 90° angular intervals in the axial direction of the rotating shaft as shown in FIG. 7(a).

Figure 15:
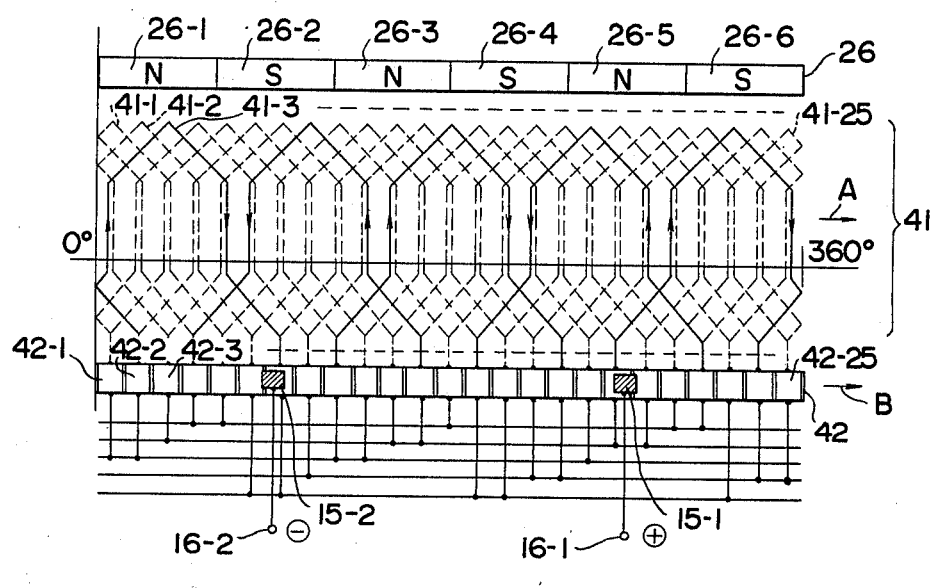
Figure 16:
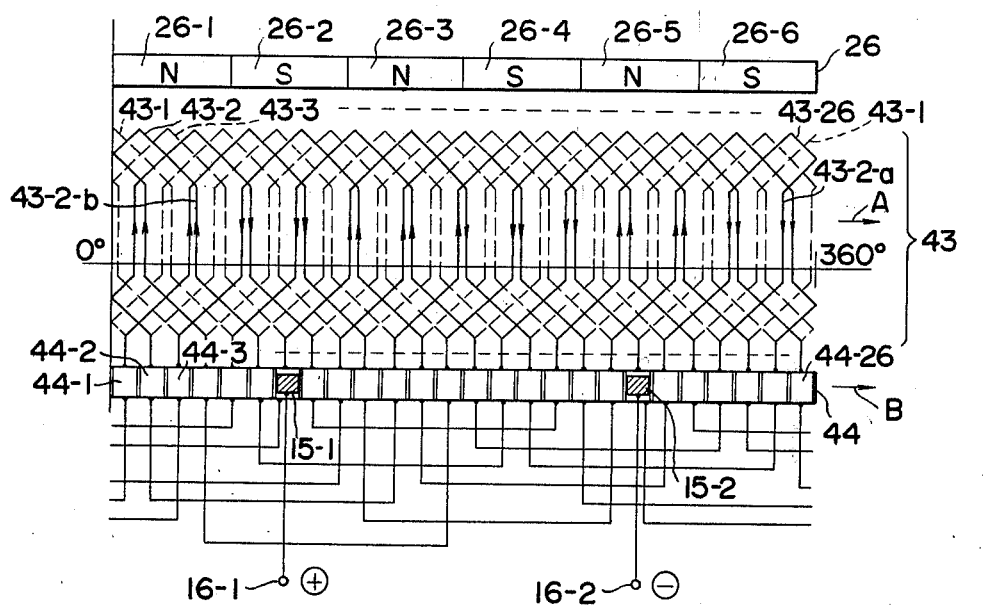
Figure 17A:
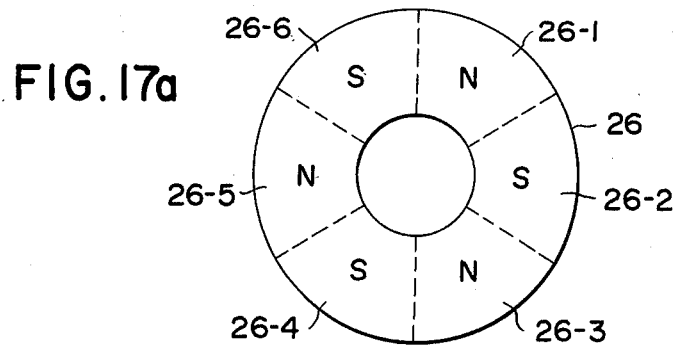
FIG. 17(*a*) is an explanatory view of the field magnet for use in the examples in FIGS. 8 to 16.

In FIGS. 8 to 16, the field magnet corresponding to the field magnet 6 as shown in FIG. 1 is a field magnet 26 with magnetic poles 26-1, 26-2, . . . , 26-6, magnetized alternately to N and S with an angular width of 60° in the axial direction of the rotating shaft as shown in FIG. 17(a).

Figure 18:
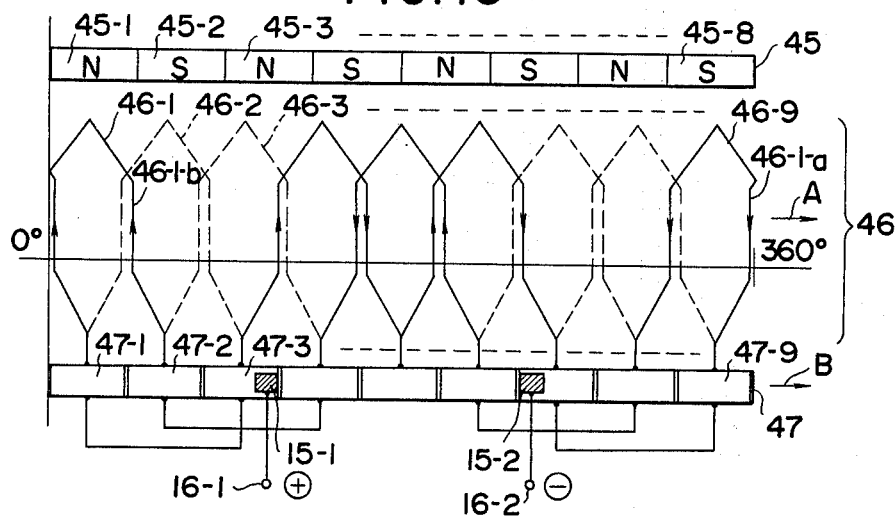
FIGS. 18 and 19 are expanded views of further examples of armature coils, field magnets and commutators for use in the motors according to the present invention.
Figure 19:
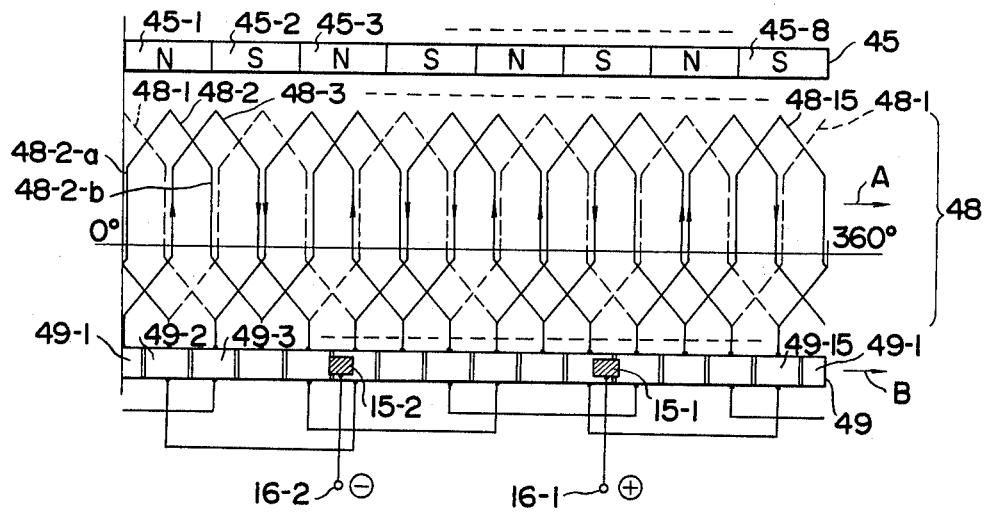
Figure 20A:
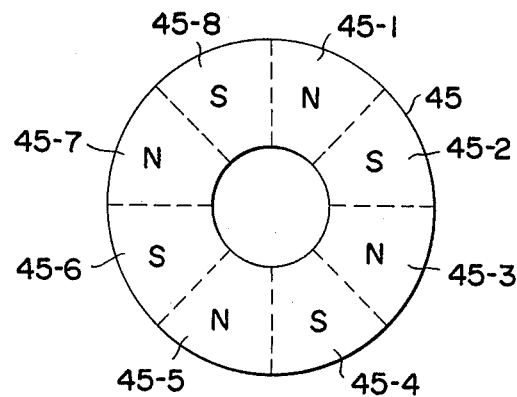
FIG. 20(*a*) is an explanatory view of the field magnet for use in the examples in FIGS. 18 and 19.

In FIGS. 18 and 19, the field magnet corresponding to the field magnet 6 as shown in FIG. 1 is a field magnet 45 with magnetic poles 45-1, 45-2, . . . , 45-8, magnetized alternately to N and S with an angular interval of 45° in the axial direction of the rotating shaft as shown in FIG. 20(a).

In all the embodiments of a DC motor which will now be explained, only the normal wave winding of armature is illustrated for convenience of explanation. However, that winding is not limited to the normal winding, but normal multiplex wave winding and multiply re-entrant wave winding can also be employed.

Figure 2:
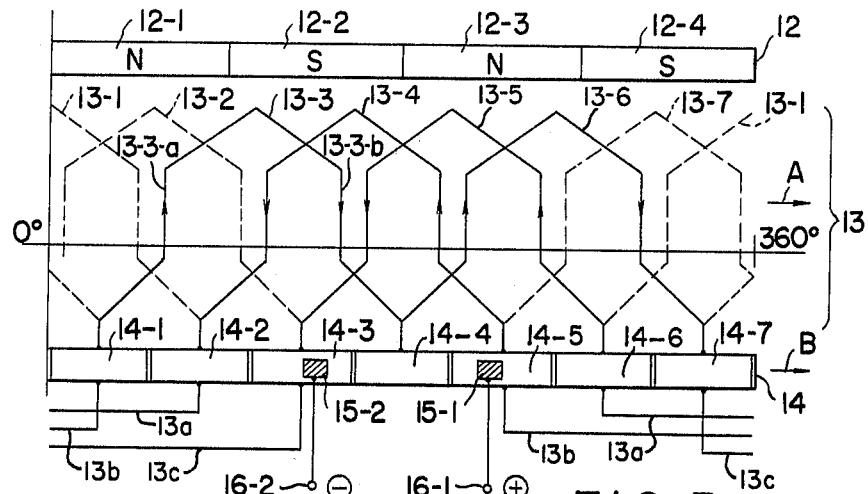
FIGS. 2, 3, 4(*a*), 4(*b*), 5 and 6 are expanded views of examples of armature coils, field magnets and commutators for use in the motors according to the present invention.
Figure 7B:
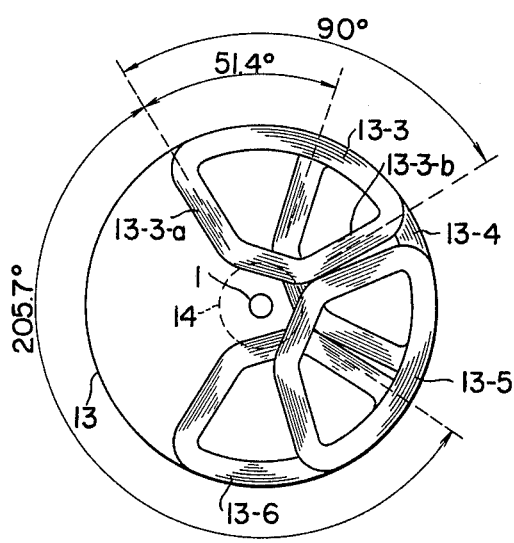

Referring to FIG. 2, there is shown an expanded view of an example of a DC motor comprising a field magnet with four magnetic poles 2n wherein n is an integer (in this case, n=2, 2n=4) and four armature coils. In an armature 13, armature coils 13-3, 13-4, 13-5 and 13-6 are arranged as shown in FIG. 7(b) and those armature coils are integrally molded. The armature coils 13-3 and 13-4, the armature coils 13-4 and 13-5, and the armature coils 13-5 and 13-6 are each positioned with about 51.4 degrees angular intervals (4/7 the magnetic pole width). The armature coils 13-6 and 13-3 are positioned with about 205.7 degrees angular intervals (16/7 the magnetic pole width) and they are partly overlapped. The angular intervals of the conductive portions (in the case of the armature coil 13-3, its conductor portions are portions 13-3-a and 13-3-b.), which conductive portions contribute to the generation of torque, is set at 90 degrees so as to be almost equal to the magnetic pole width. This corresponds to the armature 7 shown in FIG. 1.

Referring back to FIG. 2, a commutator 14 which serves as electric power supply control means comprises commutator segments 14-1, 14-2, . . . , 14-7, with about 51.4 degrees angular intervals (4/7 the magnetic pole width). The armature 13 is constructed of an open-connected normal wave winding coil comprising 7 conventional armature coils with the angular intervals of the electrically conductive portion contributing to the generation of torque of each armature coil set equal to the magnetic pole width, which open-connected normal wave winding coil is short-circuited through means for short-circuiting three armature coils as shown by dotted lines as shown in the figure through the commutator segments which serve as electric power supply control means.

The open-connected normal wave winding coil will now be explained in detail.

Seven armature coils 13-1, 13-2, . . . , 13-7 are subjected to wave winding connection and the respective connecting portions of the armature coils 13-1 and 13-4, the armature coils 13-4 and 13-7, the armature coils 13-7 and 13-3, the armature coils 13-3 and 13-6, the armature coils 13-6 and 13-2, the armature coils 13-2 and 13-5, and of the armature coils 13-5 and 13-1 are connected to commutator segments 14-2, 14-5, 14-1, 14-4, 14-7, 14-3 and 14-6.

In the embodiment of a DC motor according to the present invention, part of the armature 13 is constructed in such a manner that the winding initiation terminals of predetermined armature coils and the winding termination terminals of other predetermined armature coils are short-circuited by a short-circuit member, such as a conductor line, through commutator segments which constitute power supply control means, so that part of the armature 13 constitutes a short-circuit means. More specifically, the commutator segment 14-2 to which the winding initiation terminal of the armature coil 13-4 is connected is short-circuited with the commutator segment 14-6 to which the winding end terminal of the armature coil 13-5 is connected. Likewise, the commutator segment 14-1 to which the winding initiation terminal of the armature coil 13-3 is connected is short-circuited with the commutator segment 14-5 to which the winding end terminal of the armature coil 13-4 is connected. Further, the commutator segment 14-3 to which the winding initiation terminal of the armature coil 13-5 is connected is short-circuited with the commutator segment 14-7 to which the winding end terminal of the armature coil 13-6 is connected.

Reference numerals 15-1 and 15-2 indicate brushes which serve as power supply control means to which power is supplied respectively from a positive pole 16-1 of a DC power source and a negative pole 16-2 of the same. The angular intervals are 90° (negative pole width) in this embodiment. However, 270° angular intervals (which corresponds to three times the magnetic pole width) are equivalent to the above and therefore can be adopted.

In the configuration shown in FIG. 2, the above-mentioned short-circuiting means and four armature coils, more specifically, the armature coil 13-4, the short-circuit member 13a, the armature coil 13-5 in the first series, and the short-circuit member 13b, the armature coils 13-3, 13-6 and the short-circuit member 13c in the second series are connected in parallel to the positive and negative poles 16-1 and 16-2 of the DC power source. When current flows in the direction of the arrow, torque is generated in each armature coil, so that the armature 13 and the commutator 14 are respectively rotated in the directions of the arrows A and B and work as commutator motor.

Figure 3:
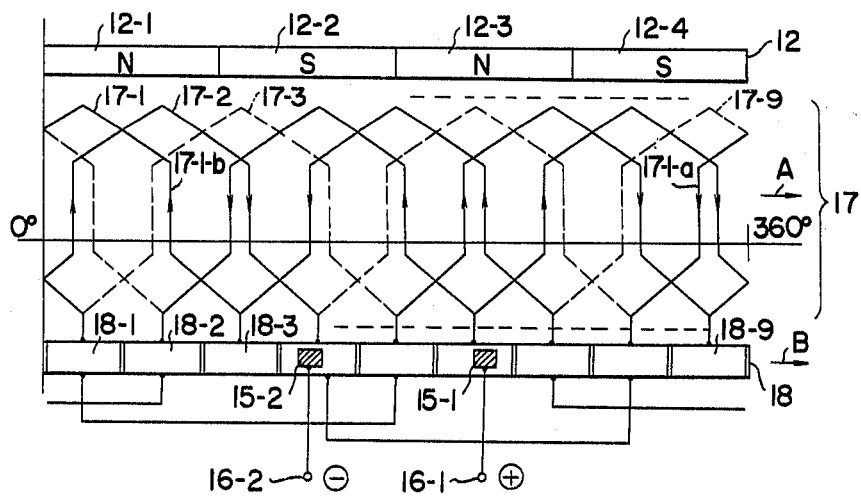
Figure 7C:
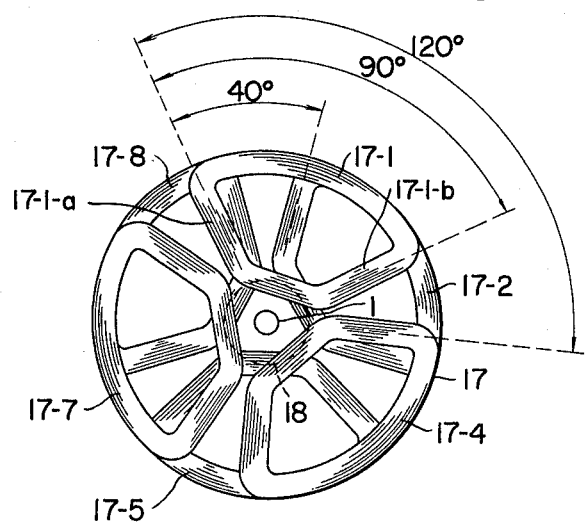

Referring to FIG. 3, there is shown an expanded view of another embodiment of a DC motor according to the present invention comprising a field magnet with four magnetic poles and six armature coils. In an armature 17, armature coils 17-1, 17-2, 17-4, 17-5, 17-7 and 17-8 are arranged as shown in FIG. 7(c) and those armature coils are integrally molded. Specifically, the armature coils 17-1, 17-4 and 17-7 are arranged with 120 degrees angular intervals (4/3 the magnetic pole width) and with an equal pitch on the upper surface of a disc-shaped armature. The angular intervals of the conductive portions (in the case of the armature coil 17-1, its conductive portions are portions 17-1-a and 17-1-b), which conductive portions contribute to the generation of torque, are 90 degrees so as to be substantially equal to the magnetic pole width. The three armature coils are positioned side by side. The armature coils 17-2, 17-5 and 17-8 are arranged side by side on the lower surface of the disc-shaped armature with the same angular intervals as mentioned above. The upper armature coils and the lower armature coils are double layered with a phase shift of 40 degrees (4/9 the magnetic pole width), forming a disc-shaped armature, which corresponds to the armature 7 as shown in FIG. 1.

Referring back to FIG. 3, a commutator 18 which serves as electric power supply control means comprises commutator segments 18-1, 18-2, . . . , 18-9, with 40 degrees angular intervals (4/9 the magnetic pole width). The armature 17 is constructed of an open-connected normal wave winding coil comprising nine conventional armature coils with the angular intervals of the electrically conductive portion contributing to the generation of torque in each armature coil set equal to the magnetic pole width, which open-connected normal wave winding coil is short-circuited through a short-circuit means for short-circuiting three armature coils as shown by dotted line in the figure through the commutator segments which serve as electric power supply control means.

The open-connected normal wave winding coil will now be explained in detail.

Nine armature coils 17-1, 17-2, . . . , 17-9 are subjected to wave winding connection and the respective connecting portions of the armature coils 17-1 and 17-5, the armature coils 17-5 and 17-9, the armature coils 17-9 and 17-4, the armature coils 17-4 and 17-8, the armature coils 17-8 and 17-3, the armature coils 17-3 and 17-7, the armature coils 17-7 and 17-2, the armature coils 17-2 and 17-6, and of the armature coils 17-6 and 17-1 are connected to commutator segments 18-3, 18-7, 18-2, 18-6, 18-1, 18-5, 18-9, 18-4 and 18-8.

In this embodiment of a DC motor according to the present invention, part of the armature 17 is constructed in such a manner that the winding initiation terminals of predetermined armature coils and the winding termination terminals of other predetermined coils are short-circuited by a short-circuit member, such as a conductive line, through commutator segments which constitute electric power supply control means, so that part of the armature 17 constitutes a short-circuit means. More specifically, the commutator segment 18-2 to which the winding initiation terminal of the armature coil 17-4 is connected is short-circuited with the commutator segment 18-7 to which the winding end terminal of the armature coil 17-5 is connected. Likewise, the commutator segment 18-5 to which the winding initiation terminal of the armature coil 17-7 is connected is short-circuited with the commutator segment 18-1 to which the winding end terminal of the armature coil 17-8 is connected. Further, the commutator segment 18-8 to which the winding initiation terminal of the armature coil 17-1 is connected is short-circuited with the commutator segment 18-4 to which the winding end terminal of the armature coil 17-2 is connected.

The angular intervals of the brushes 15-1 and 15-2, which serve as electric power supply control means, are the same as explained previously by referring to FIG. 2.

In the configuration shown in FIG. 3, the above-mentioned short-circuiting means and six armature coils, more specifically, the armature coil 17-4, the short-circuit member, the armature coils 17-5 and 17-1, and the short-circuit member in the first series and the armature coils 17-8, the short-circuit member and the armature coils 17-7 and 17-2 in the second series are connected in parallel to the positive and negative poles 16-1 and 16-2 of the DC power source. When current flows in the direction of the arrow, torque is generated in each armature coil, so that the armature 17 and the commutator 18 are respectively rotated in the directions of the arrows A and B and work as commutator motor.

Figure 4A:
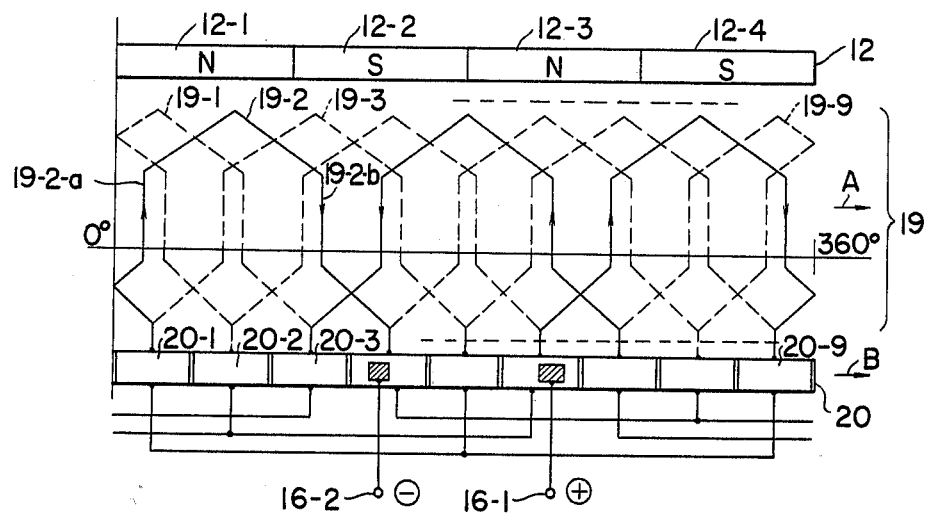
Figure 7D:
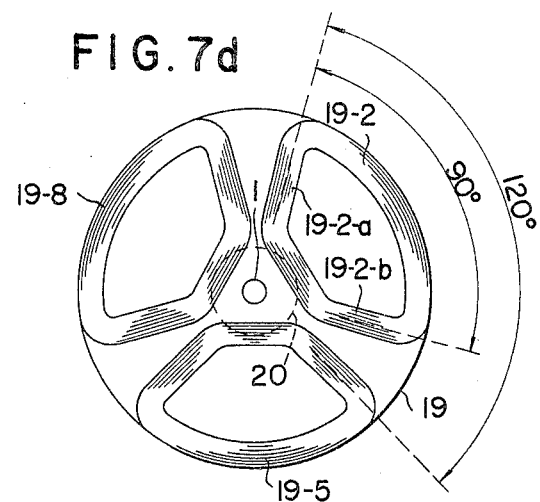

Referring to FIG. 4(a), there is shown an expanded view of a further embodiment of a DC motor according to the present invention, comprising a field magnet with four magnetic poles and three armature coils. In an armature 19, armature coils 19-2, 19-5 and 19-8 are arranged as shown in FIG. 7(d) and those armature coils are integrally molded. These armature coils are arranged with 120 degrees angular intervals (4/3 the magnetic pole width) and with an equal pitch without being superimposed. The angular intervals of the conductive portions (in the case of the armature coil 19-2, its conductive portions are 19-2-a and 19-2-b), which conductive portions contribute to the generation of torque, is 90 degrees so as to be substantially equal to the magnetic pole width, corresponding to the armature 7 as shown in FIG. 1.

Referring back to FIG. 4(a), a commutator 20 which serves as electric power supply control means comprises commutators segments 20-1, 20-2, . . . , 20-9, with 40 degrees angular intervals (4/9 the magnetic pole width). The armature 19 is constructed by use of an open-connected normal wave winding coil comprising nine conventional armature coils, with the angular intervals of the electrically conductive portion, contributing to the generation of torque of each armature coil, set equal to the magnetic pole width, which open-connected normal wave winding coil is short-circuited through a short-circuit means for short-circuiting six armature coils as shown by dotted lines in the figure through the commutator segments which serve as electric power supply control means.

This open-connected normal wave winding coil will now be explained in detail.

Nine armature coils 19-1, 19-2, . . . , 19-9 are subjected to wave winding connection and the respective connecting portions of the armature coils 19-1 and 19-5, the armature coils 19-5 and 19-9, the armature coils 19-9 and 19-4, the armature coils 19-4 and 19-8, the armature coils 19-8 and 19-3, the armature coils 19-3 and 19-7, the armature coils 19-7 and 19-2, the armature coils 19-2 and 19-6, and of the armature coils 19-6 and 19-1 are connected to commutator segments 20-3, 20-7, 20-2, 20-6, 20-1, 20-5, 20-9, 20-4 and 20-8.

In this embodiment of a DC motor according to the present invention, part of the armature 19 is constructed in such a manner that the winding initiation terminals of predetermined armature coils and the winding end terminals of other predetermined coils are short-circuited by a short-circuit member, such as a conductive line, through commutator segments which constitute electric power supply control means, so that part of the armature 19 constitutes a short-circuit means. More specifically, the commutator segment 20-3 to which the winding initiation terminal of the armature coil 19-5 is connected is short-circuited through the commutator segment 20-2 with the commutator segment 20-7 to which the winding end terminal of the armature coil 19-5 is connected. Further, the commutator segment 20-9 to which the winding initiation terminal of the armature coil 19-2 is connected is short-circuited through the commutator segment 20-5 with the commutator segment 20-1 to which the winding end terminal of the armature coil 19-8 is connected.

The angular intervals of the brushes 15-1 and 15-2, which serve as electric power supply control means, are the same as explained previously by referring to FIG. 2.

In the configuration shown in FIG. 4(a), the above-mentioned short-circuiting means and three armature coils, more specifically, the short-circuit member, the armature coil 19-5 and the short-circuit member in the first series and the armature coil 19-8, the short-circuit member and the armature coil 19-2 in the second series are connected in parallel to the positive and negative poles 16-1 and 16-2 of the DC power source. When current flows in the direction of the arrow, torque is generated in each armature coil, so that the armature 19 and the commutator 20 are respectively rotated in the direction of the arrows A and B and work as commutator motor.

Figure 4B:
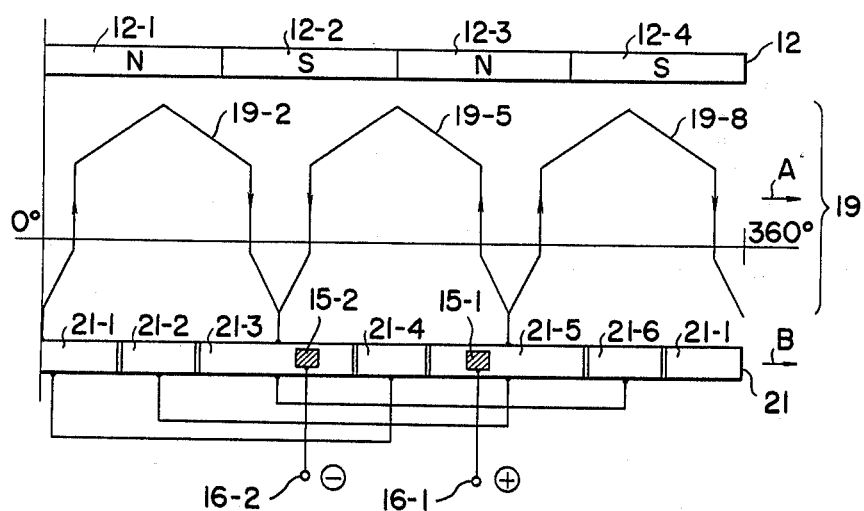

In the embodiment of a DC motor according to the present invention as shown in FIG. 4(a), the commutator segments 20-4 and 20-3, the commutator segments 20-7 and 20-6, and the commutator segments 20-1 and 20-9, which are respectively positioned adjacently to each other and short-circuited to each other. In contrast to this, in the embodiment of a DC motor according to the present invention as shown in FIG. 4(b), the above-mentioned respective commutator pairs are replaced by single commutator segments 21-3, 21-5 and 21-1 and the performance of the DC motor in FIG. 4(b) is substantially the same as the performance of the DC motor in FIG. 4(a). As a matter of course, in other embodiments of a DC motor according to the present invention, the commutator segments positioned adjacent to each other and short-circuited can be replaced by single commutator segments of the type employed in the DC motor shown in FIG. 4(b).

Figure 7E:
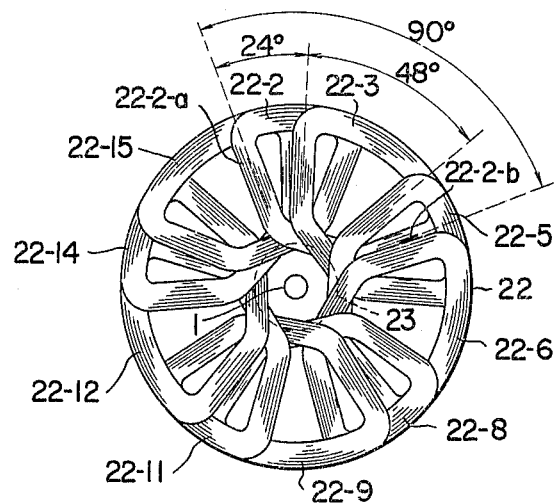

Referring to FIG. 5, there is shown an expanded view of a further embodiment of a DC motor according the present invention, comprising a field magnet with four magnetic poles and ten armature coils. In an armature 22, armature coils 22-2, 22-3, 22-5, 22-6, 22-8, 22-9, 22-11, 22-12, 22-14 and 22-15 are arranged as shown in FIG. 7(e) and those armature coils are integrally molded. More specifically, the armature coils 22-2 and 22-3, the armature coils 22-5 and 22-6, the armature coils 22-8 and 22-9, the armature coils 22-11 and 22-12, and the armature coils 22-14 and 22-15 are arranged with 24 degrees angular intervals (4/15 the magnetic pole width), while the armature coils 22-3 and 22-5, the armature coils 22-6 and 22-8, the armature coils 22-9 and 22-11, the armature coils 22-12 and 22-14, and the armature coils 22-15 and 22-2 are arranged with 48 degrees angular intervals (8/15 the magnetic pole width) and partly overlap. The angular intervals of the conductive portions (in the armature coil 22-2, its conductive portions are portions 22-2-a and 22-2-b, which conductive portions contribute to the generation of torque, are 90 degrees so as to be substantially equal to the magnetic pole width, corresponding to the armature 7 as shown in FIG. 1.

Referring back to FIG. 5, a commutator 23 which serves as electric power supply control means comprises commutator segments 23-1, 23-2, ..., 23-15, with 24 degrees angular intervals (4/15 the magnetic pole width). The armature 22 is constructed by use of an open-connected normal wave winding coil comprising 15 conventional armature coils, with the angular intervals of the electric power supply portion, contributing to the generation of torque in each armature coil, set equal to the magnetic pole width, which open-connected normal wave winding coil is short-circuited through a short-circuit means for short-circuiting five armature coils as shown by dotted lines in the figure through the commutator segments which serve as electric power supply control means.

This open-connected normal wave winding coil will now be explained in detail.

Fifteen armature coils 22-1, 22-2, ..., 22-15 are subjected to wave winding connection and the respective connecting portions of the armature coils 22-1 and 22-8, the armature coils 22-8 and 22-15, the armature coils 22-15 and 22-7, the armature coils 22-7 and 22-14, the armature coils 22-14 and 22-6, the armature coils 22-6 and 22-13, the armature coils 22-13 and 22-5, the armature coils 22-5 and 22-12, the armature coils 22-12 and 22-4, the armature coils 22-4 and 22-11, the armature coils 22-11 and 22-3, the armature coils 22-3 and 22-10, the armature coils 22-10 and 22-2, the armature coils 22-2 and 22-9, and of the armature coils 22-9 and 22-1 are connected to commutator segments 23-4, 23-11, 22-3, 23-10,23-2, 23-9, 23-1, 23-8, 23-15, 23-7, 23-14, 23-6, 23-13, 23-5 and 23-12.

In this embodinent of a DC motor according to the present invention, part of the armature 22 is constructed in such a manner that the winding initiation terminals of prdetermined armature coils and the winding end terminals of other predetermined coils are short-circuited by a short-circuit member, such as a conductor line, through commutator segments which constitute electric power supply control means, so that part of the armature 22 constitutes a short-circuit means. More specifically, the commutator segment 23-4 to which the winding initiation terminal of the armature coil 22-8 is connected is short-circuited with the commutator segment 23-12 to which the winding end terminal of the armature coil 22-9 is connected. Likewise, the commuator segment 23-10 to which the winding initiation terminal of the armature coil 22-14 is connected is short-circuited with the commutator segment 23-3 to which the winding end terminal of the armature coil 22-15 is connected. Further, the commutator segment 23-1 to which the winding initiation terminal of the armature coil 22-5 is connected is short-circuited with the commutator segment 23-9 to which the winding end terminal of the armature coil 22-6 is connected. The commutator segment 23-7 to which the winding initiation terminal of the armature coil 22-11 is connected is short-circuited with the commutator segment 23-15 to which the winding end terminal of the armature coil 22-12 is connected. The commutator segment 23-13 to which the winding initiation terminal of the armature coil 22-2 is connected is short-circuited with the commutator segment 23-6 to which the winding end terminal of the armature coil 22-3 is connected.

The angular intervals of brushes 15-1 and 15-2, which serve as electric power supply control means, are the same as explained previously by referring to FIG. 2.

In the configuration shown in FIG. 5, the above-mentioned short-circuiting means and ten armature coils, more specifically, the short-circuit member, the armature coils 22-14 and 22-8, and the short-circuit member in the first series and the armature coils 22-14 and 22-6, the short-circuit member, the armature coils 22-5 and 22-12, the short-circuit member, and the armature coils 22-11 and 22-3 in the second series are connected in parallel to the positive and negative poles 16-1 and 16-2 of the DC power source. When current flows in the direction of the arrow, torque is generated in each armature coil, so that the armature 22 and the commutator 23 are respectively rotated in the directions of the arrows A and B and work as commutator motor.

Figure 7F:
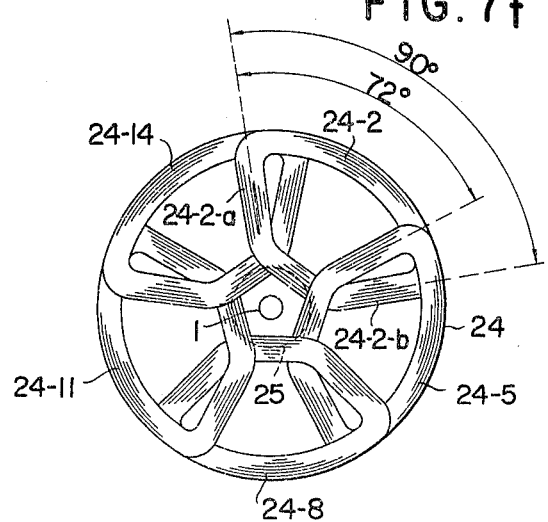

Referring to FIG. 6, there is shown an expanded view of a further embodiment of a DC motor according to the present invention comprising a field magnet with four magnetic poles and five armature coils. In an armature 24, armature coils 24-2, 24-5, 24-8, 24-11 and 24-14 are arranged as shown in FIG. 7(f) and those armature coils are integrally molded. These armature coils are each arranged, partly overlapping on each other, with 72 degrees angular intervals (4/5 the magnetic pole width) and with an equal pitch. The angular intervals of the conductive portions (in the armature coil 24-2, its conductive portions are portions 24-2-a and 24-2-b), which conductive portions contribute to the generation of torque, are 90 degrees so as to be substantially equal to the magnetic pole width, corresponding to the armature 7 as shown in FIG. 1.

Referring back to FIG. 6, a commutator 25 which serves as electric power supply control means comprises commutator segments 25-1, 25-2, ..., 25-15, with 24 degrees angular intervals (4/15 the magnetic pole width). The armature 24 is constructed of an open-connected normal wave winding coil comprising 15 conventional armature coils, with the angular intervals of the electrically conductive portion contributing to the generation of torque in each armature coil set equal to the magnetic pole width, which open-connected normal wave winding coil is short-circuited through a short-circuit means for short-circuiting ten armature coils as shown by dotted lines in the figure through the commutator segments which serve as electric power supply control means.

Since the above-mentioned open-connected normal wave winding coil is the same as that shown in FIG. 5, the detailed explanation thereof is omitted.

In this embodiment of a DC motor according to the present invention, part of the armature 24 is constructed in such a manner that the winding initiation terminals of predetermined armature coils and the winding end terminals of other predetermined coils are short-circuited by a short-circuit member, such as a conductor line, through commutator segments which constitute electric power supply control means, so that part of the armature 24 constitutes a short-circuit means. More specifically, the commutator segment 25-13 to which the winding initiation terminal of the armature coil 24-2 is connected is short-circuited through the commutator segment 25-5 with the commutator segment 25-12 to which the winding end terminal of the armature coil 24-8 is connected. Likewise, the commutator segment 25-7 to which the winding initiation terminal of the armature coil 24-11 is connected is short-circuited through the commutator segment 25-14 with the commutator segment 25-6 to which the winding end terminal of the armature coil 24-2 is connected. Further, the commutator segment 25-1 to which the winding initiation terminal of the armature coil 24-5 is connected is short-circuited through the commutator segment 25-8 with the commutator segment 25-2 to which the winding end terminal of the armature coil 24-11 is connected. The commutator segment 25-10 to which the winding initiation terminal of the armature coil 24-14 is connected is short-circuited through the commutator segment 25-7 with the commutator segment 25-9 to which the winding end terminal of the armature coil 24-5 is connected. The commutator segment 25-4 to which the winding initiation terminal of the armature coil 24-8 is short-circuited through the commutator segment 25-11 with the commutator segment 25-3 to which the winding end terminal of the armature coil 24-14 is connected.

The angular intervals of brushes 15-1 and 15-2, which serve as electric power supply control means, are the same as explained previously by referring to FIG. 2.

In the configuration shown in FIG. 6, the above-mentioned short-circuiting means and five armature coils, more specifically, the armature coil 24-2, the short-circuit member, the armature coil 24-8, the short-circuit member, and the armature coil 24-14 in the first series and the short-circuit member, the armature coil 24-14 and the armature coil 24-11, the short-circuit member, the armature coil 24-5, the short-circuit member in the second series are connected in parallel to the positive and negative poles 16-1 and 16-2 of the DC power source. When current flows in the direction of the arrow, torque is generated in each armature coil, so that the armature 24 and the commutator 25 are respectively rotated in the directions of the arrows A and B and work as commutator motor.

Figure 8:
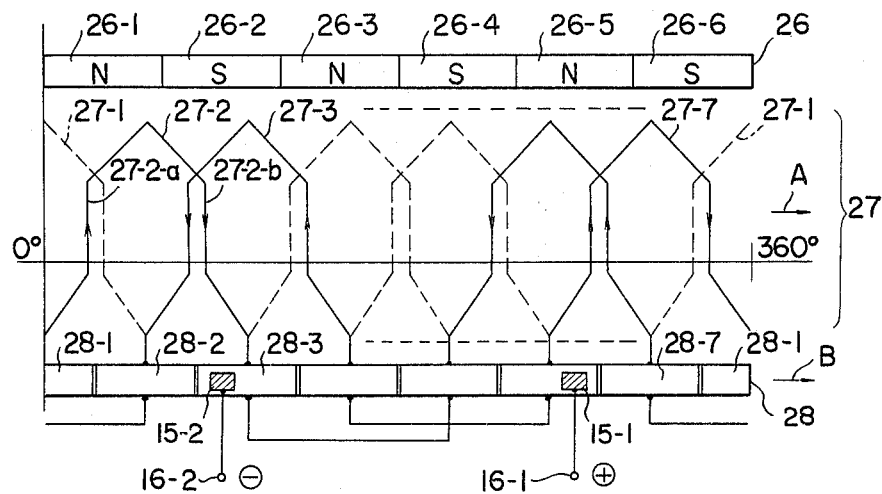
FIGS. 8, 9, 10, 11, 12, 13, 14, 15 and 16 are expanded views of further examples of the armature coils, field magnets and commutators of motors according to the present invention.
Figure 17B:
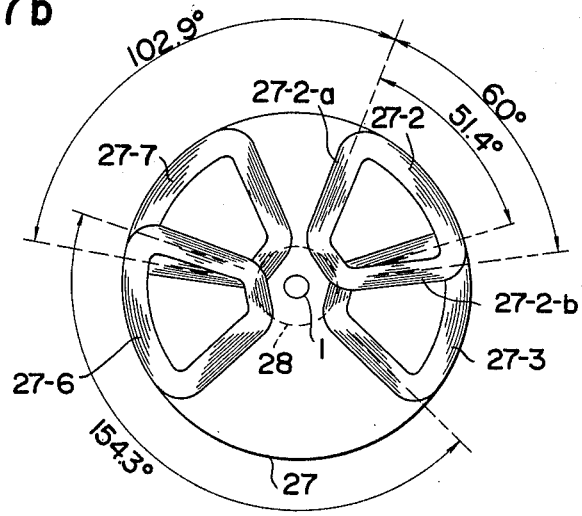

Referring to FIG. 8, there is shown an expanded view of a further embodiment of a DC motor according to the present invention, comprising a field magnet with six magnetic poles (2n=6, n=3) and four armature coils. In an armature 27, armature coils 27-2, 27-3, 27-6 and 27-7 are arranged as shown in FIG. 17(b) and those armature coils are integrally molded. More specifically, the armature coils 27-2 and 27-3 and the armature coils 27-6 and 27-7 are arranged with about 51.4 degrees angular intervals (6/7 the magnetic pole width), while the armature coils 27-3 and 27-6 are arranged with about 154.3 degrees angular intervals (18/7 the magnetic pole width) and the armature coils 27-7 and 27-2 are arranged with about 102.9 degrees angular intervals (12/7 the magnetic pole width). These armature coils partly overlap on each other. The angular intervals of the conductive portions (in the armature coil 27-2, its conductive portions are portions 27-2-a and 27-2-b), which conductive portions contribute to the generation of torque, are 60 degrees so as to be substantially equal to the magnetic pole width, corresponding to the armature 7 as shown in FIG. 1.

Referring back to FIG. 8, a commutator 28 which serves as electric power supply control means comprises commutator segments 28-1, 28-2, ..., 28-7, with about 51.4 degrees angular intervals (6/7 the magnetic pole width). The armature 27 is constructed by use of an open-connected normal wave winding coil comprising seven conventional armature coils, with the angular intervals of the electrically condcutive portion, contributing to the generation of torque in each armature coil, set equal to the magnetic pole width, which open-connected normal wave winding coil is short-circuited through a short-circuit means for short-circuiting four armature coils as shown by dotted lines in the figure through the commutator segments which serve as electric power supply control means.

This open-connected normal wave winding coil will now be explained in detail.

Seven armature coils 27-1, 27-2, ..., 27-7 are subjected to wave winding connection and the respective connecting portions of the armature coils 27-1 and 27-3, the armature coils 27-3 and 27-5, the armature coils 27-5 and 27-7, the armature coils 27-7 and 27-2, the armature coils 27-2 and 27-4, the armature coils 27-4 and 27-6, end of the armature coils 27-6 and 27-1 are connected to commutator segments 28-2, 28-4, 28-6, 28-1, 28-3, 28-5 and 28-7.

In this embodiment of a DC motor according to the present invention, part of the armature 27 is constructed in such a manner that the winding initiation terminals of predetermined armature coils and the winding end terminals of other predetermined armature coils are short-circuited by a short-circuit member, such as a conductor line, through commutator segments which constitute electric power supply control means, so that part of the armature 27 consitutes a short-circuit means. More specifically, the commutator segment 28-2 to which the winding initiation terminal of the armature coil 27-3 is connected is short-circuited with the commutator segment 28-7 to which the winding end terminal of the armature coil 27-6 is connected. Likewise, the commutator segment 28-6 to which the winding initiation terminal of the armature coil 27-7 is connected is short-circuited with the commutator segment 28-4 to which the winding end terminal of the armature coil 27-3 is connected. Further, the commutator segment 28-5 to which the winding initiation terminal of the armature coil 27-6 is connected is short-circuited with the commutator segment 28-3 to which the winding end terminal of the armature coil 27-2 is connected.

The angular intervals of brushes 15-1 and 15-2, which serve as electric power supply control means, are 180 degrees (three times the magnetic pole width).

In this embodiment, 60 degrees angular intervals (the same as the magnetic pole width) and 300 degrees angular intervals (five times the magnetic pole width) cannot be adopted since the brushes are short-circuited at those angular intervals.

In the configuration shown in FIG. 8, the above-mentioned short-circuiting means and four armature coils, more specifically, the short-circuit member, the armature coil 27-3, the short-circuit member, the armature coil 27-6 and the short-circuit member in the first series and the armature coils 27-7 and 27-2 in the second series are connected in parallel to the positive and negative poles 16-1 and 16-2 of the DC power source. When current flows in the direction of the arrow, torque is generated in each armature coil, so that the armature 27 and the commutator 28 are respectively rotated in the directions of the arrows A and B and work as commutator motor.

Figure 9:
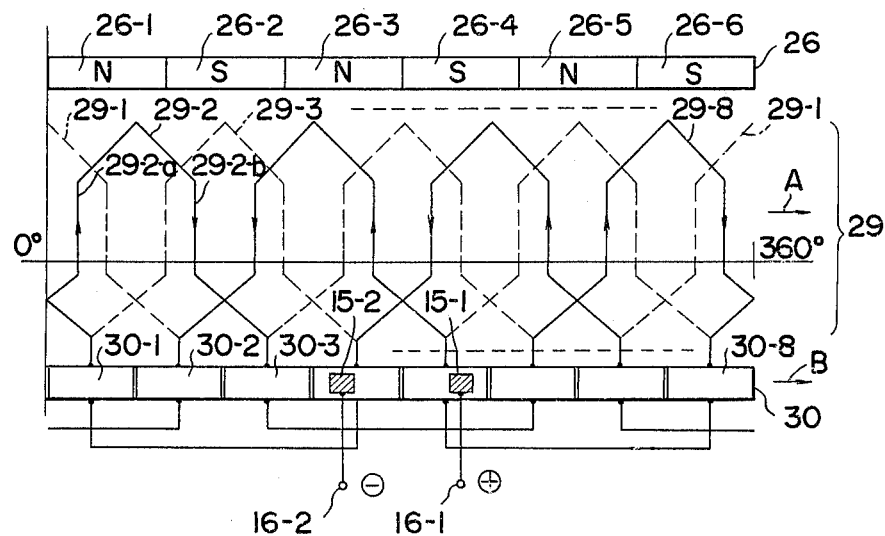
Figure 17C:
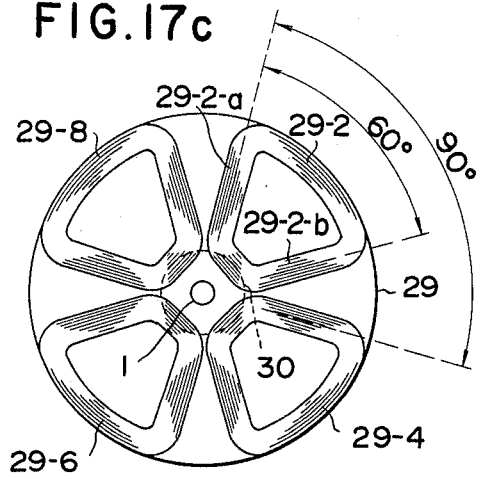

Referring to FIG. 9, there is shown an expanded view of a further embodiment of a DC motor according to the present invention, comprising a field magnet with six magnetic poles and four armature coils. In the armature 29, armature coils 29-2, 29-4, 29-6 and 29-8 are arranged as shown in FIG. 17(c) and those armature coils are integrally molded. These armature coils arranged, without being superimposed on each other, with 90 degrees angular intervals (3/2 the magnetic pole width).

The angular intervals of the conductive portions (in the armature coil 29-2, its conductive portions are portions 29-2-a and 29-2-b), which conductive portions contribute to the generation of torque, are 60 degrees so as to be substantially equal to the magnetic pole width, corresponding to the armature 7 as shown in FIG. 1.

Referring back to FIG. 9, a commutator 30 which serves as electric power supply means comprises commutator segments 30-1, 30-2, . . . , 30-8, with 45 degrees angular intervals (¾ the magnetic pole width). The armature 29 is constructed by use of a cross-connected normal wave winding coil comprising eight conventional armature coils, with the angular intervals of the electrically conductive portion, contributing to the generation of torque in each armature coil, set equal to to the magnetic pole width, which cross-connected normal wave winding coil is short-circuited through a short-circuit means for short-circuiting four armature coils as shown by dotted lines in the figure through the commutator segments which serve as electric power supply means.

This cross-connected normal wave winding coil will now be explained in detail.

Eight armature coils 29-1, 29-2, . . . , 29-8 are subjected to wave winding connection and the respective connecting portions of the armature coils 29-1 and 29-4, the armature coils 29-4 and 29-7, the armature coils 29-7 and 29-2, the armature coils 29-2 and 29-5, the armature coils 29-5 and 29-8, the armature coils 29-8 and 29-3, the armature coils 29-3 and 29-6 and of the armature coils 29-6 and 29-7 are connected to commutator segments 30-2, 30-5, 30-8, 30-3, 30-6, 30-1, 30-4 and 30-7.

In this embodiment of a DC motor according to the present invention, part of the armature 29 is constructed in such a manner that the winding initiation terminals of predetermined armature coils and the winding end terminals of other predetermined armature coils are short-circuited by a short-circuit member, such as a conductor line, through commutator segments which constitute electric power supply control means, so that part of the armature 24 constitutes a short-circuit means. More specifically, the commutator segment 30-2 to which the winding initiation terminal of the armature coil 29-4 is connected is short-circuited with the commutator segment 30-7 to which the winding end terminal of the armature coil 29-6 is connected. Likewise, the commutator segment 30-8 to which the winding initiation terminal of the armature coil 29-2 is connected is short-circuited with the commutator segment 30-5 to which the winding end terminal of the armature coil 29-4 is connected. Further, the commutator segment 30-6 to which the winding initiation terminal of the armature coil 29-8 is connected is short-circuited with the commutator segment 30-3 to which the winding end terminal of the armature coil 29-2 is connected.

The commutator segment 30-4 to which the winding initiation terminal of the armature coil 29-6 is connected is short-circuited with the commutator segment 30-1 to which the winding end terminal of the armature coil 29-8 is connected.

The angular intervals of brushes 15-1 and 15-2, which serve as electric power supply means, are 60 degrees (same as the magnetic pole width).

In this embodiment, 300 degrees angular intervals (five times the magnetic pole width) is equivalent to 60 degrees angular intervals. However, 180 degrees angular intervals cannot be adopted since the brushes are short-circuited at the angular intervals.

In the configuration shown in FIG. 9, the above-mentioned short-circuiting means and four armature coils, more specifically, the armature coil 29-4, the short-circuit member and the armature coil 29-6 in the first series and the short-circuit member, the armature coil 29-2, the short-circuit member, the armature coil 29-8 and the short-circuit member in the second series are connected in parallel to the positive and negative poles 16-1 and 16-2 of the DC power source. When current flows in the direction of the arrow, torque is generated in each armature coil, so that the armature 29 and the commutator 30 are respectively rotated in the directions of the arrow A and B and work as commutator motor.

Figure 10:
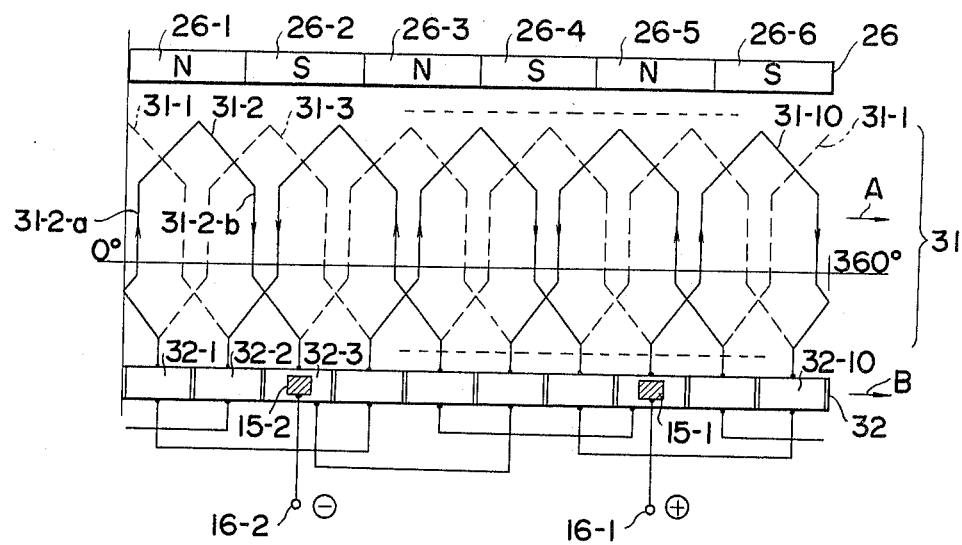
Figure 17E:
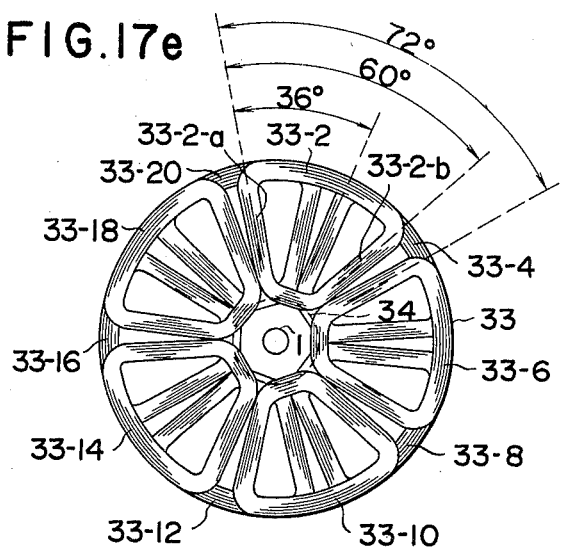
Figure 17D:
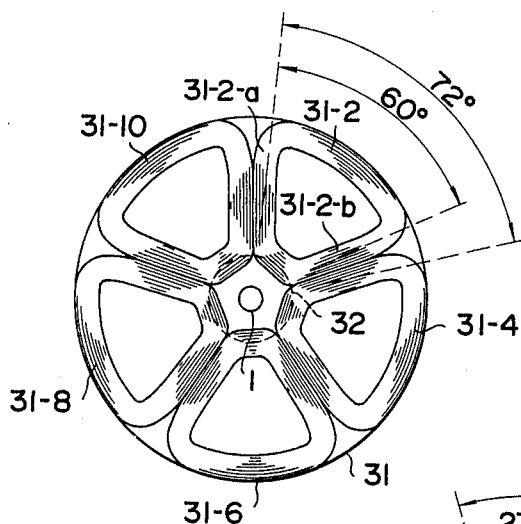
Figure 17F:
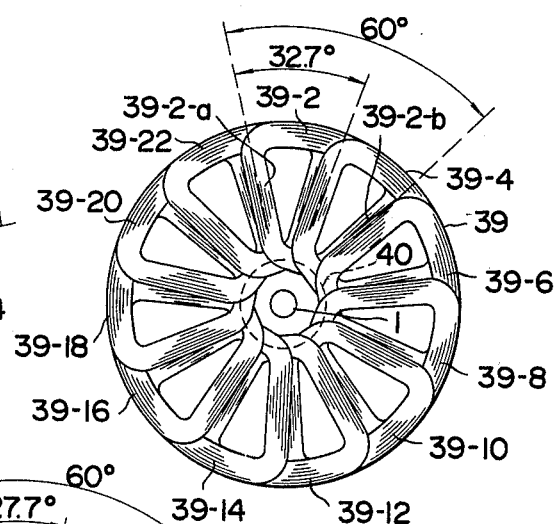
Figure 17G:
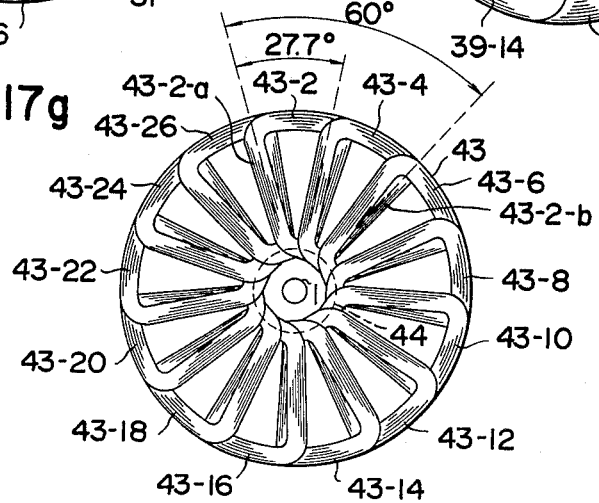

Referring to FIG. 10, there is shown an expanded view of a further embodiment of a DC motor according to the present invention, comprising a field magnet with six magnetic poles (n=3, 2n=6) and five armature coils. In an armature 31, armature coils 31-2, 31-4, 31-6, 31-8 and 31-10 are arranged as shown in FIG. 17(d) and those armature coils are integrally molded. More specifically, these armature coils are each arranged with 72 degrees angular intervals (6/5 the magnetic pole width) with an equal pitch and without being superimposed.

The angular intervals of the conductive portions (in the armature coil 31-2, its conductive portions are portions 31-2-a and 31-2-b), which conductive portions contribute to the generation of torque, are 60 degrees so as to be substantially equal to the magnetic pole width, corresponding to the armature 7 as shown in FIG. 1.

Referring back to FIG. 10, a commutator 32 which serves as electric power supply control means comprises commutator segments 32-1, 32-2, . . . , 31-10, with 36 degrees angular intervals (3/5 the magnetic pole width). The armature 31 is constructed by use of an open-connected normal wave winding coil comprising ten conventional armature coils, with the angular intervals of the electrically conductive portion, contributing to the generation of torque in each armature coil, set equal to the magnetic pole width, which open-connected normal wave winding coil is short-circuited through a short-circuit means for short-circuiting five armature coils as shown by dotted lines in the figure through the commutator segments which serve as electric power supply control means.

This open-connected normal wave winding coil will now be explained in detail.

Ten armature coils 31-1, 31-2, . . . , 31-10 are subjected to wave winding connection and the respective connecting portions of the armature coils 31-1 and 31-4, the armature coils 31-4 and 31-7, the armature coils 31-7 and 31-10, the armature coils 31-10 and 31-3, the armature coils 31-3 and 31-6, the armature coils 31-6 and 31-9, the armature coils 31-9 and 31-2, the armature coils 31-2 and 31-5, the armature coils 31-5 and 31-8 and of the armature coils 31-8 and 31-1 are connected to commutator segments 32-2, 32-5, 32-8, 32-1, 32-4, 32-7, 32-10, 32-3, 32-6 and 32-9.

In this embodiment of a DC motor according to the present invention, part of the armature 31 is constructed in such a manner that the winding initiation terminals of predetermined armature coils and the winding end terminals of other predetermined armature coils are short-circuited by a short-circuit member, such as a conductor line, through commutator segments which constitute electric power supply control means, so that part of the armature 31 constitutes a short-circuit means. More specifically, the commutator segments 23-2 to which the winding initiation terminal of the armature coil 31-4 is connected is short-circuited with the commutator segment 32-9 to which the winding end terminal of the armature coil 31-8 is connected. Likewise, the commutator segment 32-8 to which the winding initiation terminal of the armature coil 31-10 is connected is short-circuited with the commutator segment 32-5 to which the winding end terminal of the amature coil 34-4 is connected. Further, the commutator segment 32-4 to which the winding initiation terminal of the armature coil 31-6 is connected is short-circuited with the commutator segment 32-1 to which the winding end terminal of the armature coil 31-10 is connected. The commutator segment 32-10 to which the winding initiation terminal of the armature coil 31-2 is connected is short-circuited with the commutator segment 32-7 to which the winding end terminal of the armature coil 31-6 is connected. Further, the commutator segment 32-6 to which the winding initiation terminal of the armature coil 31-8 is connected is short-circuited with the commutator segment 32-3 to which the winding end terminal of the armature coil 31-2 is connected.

The angular intervals of brushes 15-1 and 15-2, which serve as electric power supply control means, are 180 degrees (three times the magnetic pole width).

In this embodiment, 60 degrees angular intervals (the same as the magnetic pole width) and 300 degrees angular intervals (five times the magnetic pole width) are substantially equivalent to 180 degrees angular intervals and can be adopted.

In the configuration shown in FIG. 10, the above-mentioned short-circuiting means and five armature coils, more specifically, the short-circuit member, the armature coils 31-4, the short-circuit member, the armature coil 31-8 and the short-circuit member in the first series and the armature coil 31-10, the short-circuit member, the armature coil 31-6, the short-circuit member and the armature coil 31-2 in the second series are connected in parallel to the positive and negative poles 16-1 and 16-2 of the DC power source. When current flows in the direction of the arrow, torque is generated in each armature coil, so that the armature 31 and the commutator 32 are respectively rotated in the directions of the arrow A and B and work as commutator motor.

Figure 11:
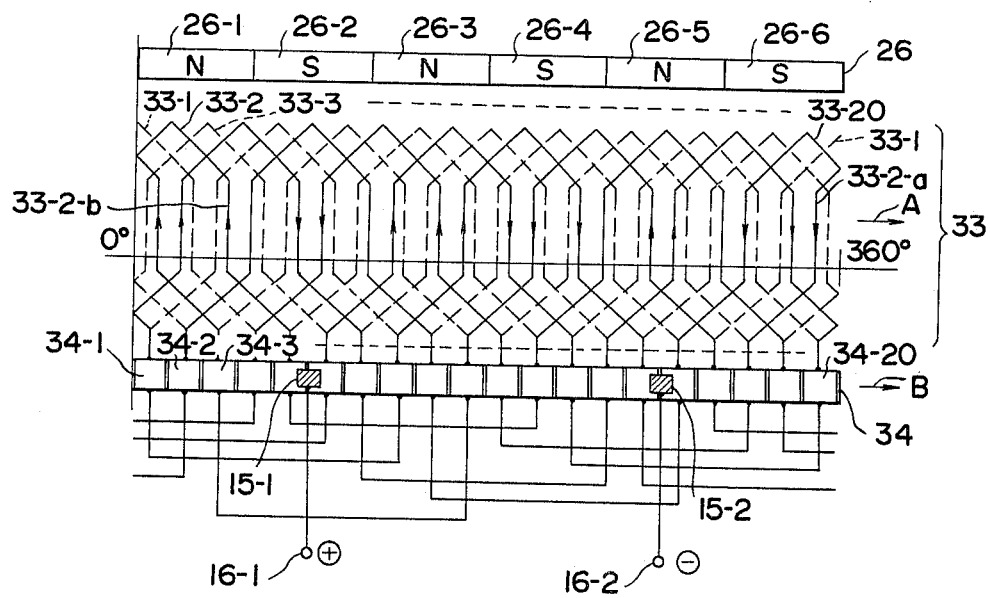

Referring to FIG. 11, there is shown an expanded view of a further embodiment of a DC motor according to the present invention, comprising a field magnet with six magnetic poles and ten armature coils. In an armature 33, armature coils 32-2, 33-4, 33-6, 33-8, 33-10, 33-12, 33-14, 33-16, 33-18 and 33-20 are arranged as shown in FIG. 17(e) and those armature coils are integrally molded. More specifically, the armature coils 33-2, 33-6, 33-10, 33-14 and 33-18 are arranged side by side on the upper surface of a disc-shaped armature with 72 degrees angular intervals (6/5 the magnetic pole width), with an equal pitch. The angular intervals of the conductive portions (in the armature coil 33-2, its conductive portions are portions 33-2-a and 33-2-b), which conductive portions contribute to the generation of torque, are 60 degrees so as to be substantially equal to the magnetic pole width and five armature coils are positioned side by side, adjacent to each other. The armature coils 33-4, 33-8, 33-12, 33-16 and 33-20 are arranged side by side on the lower surface of the disc-shaped armature with the same angular intervals as mentioned above. The upper armature coils and the lower armature coils are double layered with a phase shift of 36 degrees (3/5 the magnetic pole width), forming a disc-shaped armature, which corresponds to the armature 7 as shown in FIG. 1.

Referring back to FIG. 11, a commutator 34 which serves as electric power supply control means comprises commutator segments 34-1, 34-2, . . . , 34-20, with 18 degrees angular intervals (3/10 the magnetic pole width). The armature 33 is constructed of an cross-connected normal wave winding coil comprising 20 conventional armatute coils with the angular intervals of the electrically conductive portion contributing to the generation of torque of each armature coil set equal to the magnetic pole width, which cross-connected normal wave winding coil is short-circuited through a short-circuit means for short-circuiting ten armature coils as shown by dotted lines in the figure through the commutator segments which serve as electric power supply control means.

The cross-connected normal wave winding coil will now be explained in detail.

Twenty armature coils 33-1, 33-2, ..., 33-20 are subjected to wave winding connection and the respective connecting portions of the armature coils 33-1 and 33-8, the armature coils 33-8 and 33-15, the armature coils 33-15 and 33-2, the armature coils 33-2 and 33-9, the armature coils 33-9 and 33-16, the armature coils 33-16 and 33-3, the armature coils 33-3 and 33-10, the armature coils 33-10 and 33-17, the armature coils 33-17 and 33-4, the armature coils 33-4 and 33-11, the armature coils 33-11 and 33-18, the armature coils 33-18 and 33-5, the armature coils 33-5 and 33-12, the armature coils 33-12 and 33-19, the armature coils 33-19 and 33-6, the armature coils 33-6 and 33-13, the armature coils 33-13 and 33-20, the armature coils 33-20 and 33-7, the armature coils 33-7 and 33-14 and of the armature coils 33-14 and 33-1 are connected to commutator segments 34-4, 34-11, 34-18, 34-5, 34-12, 34-19, 34-6, 34-13, 34-20, 34-7, 34-14, 34-1, 34-8, 34-15, 34-2, 34-9, 34-16, 34-3, 34-10 and 34-17.

In this embodiment of a DC motor according to the present invention, part of the armature 33 is constructed in such a manner that the winding initiation terminals of predetermined armature coils and the winding end terminals of other predetermined coils are short-circuited by a short-circuit member, such as a conductor line, through commutator segments which constitute electric power supply control means, so that part of the armature 33 constitutes a short-circuit means. More specifically, the commutator segments 34-4 and 34-17, the commutator segments 34-18 and 34-11, the commutator segments 34-12 and 34-5, the commutator segments 34-6 and 34-19, the commutator segments 34-20 and 34-13, the commutator segments 34-14 and 34-7, the commutator segments 34-8 and 34-1, the commutator segments 34-2 and 34-15, the commutator segments 34-16 and 34-9, and the commutator segments 34-10 and 34-3 are each short-circuited.

The angular intervals of brushes 15-1 and 15-2, which serve as electric power supply control means, are the same as explained previously by referring to FIG. 10.

In the configuration shown in FIG. 11, the above-mentioned short-circuiting means and ten armature coils, more specifically, the armature coil 33-2, the short-circuit member, the armature coil 33-8, the short-circuit member, the armature coil 33-4, the short-circuit member and the armature coil 33-20, in the first series and the armature coil 33-10, the short-circuit member, the armature coil 33-4, the short-circuit member, the armature coil 33-18, the short-circuit member and the armature coil 33-12 in the second series are connected in parallel to the positive and negative poles 16-1 and 16-2 of the DC power source. When current flows in the direction of the arrow, torque is generated in each armature coil, so that the armature 13 and the commutator 32 are respectively rotated in the directions of the arrows A and B and work as commutator motor.

Figure 12:
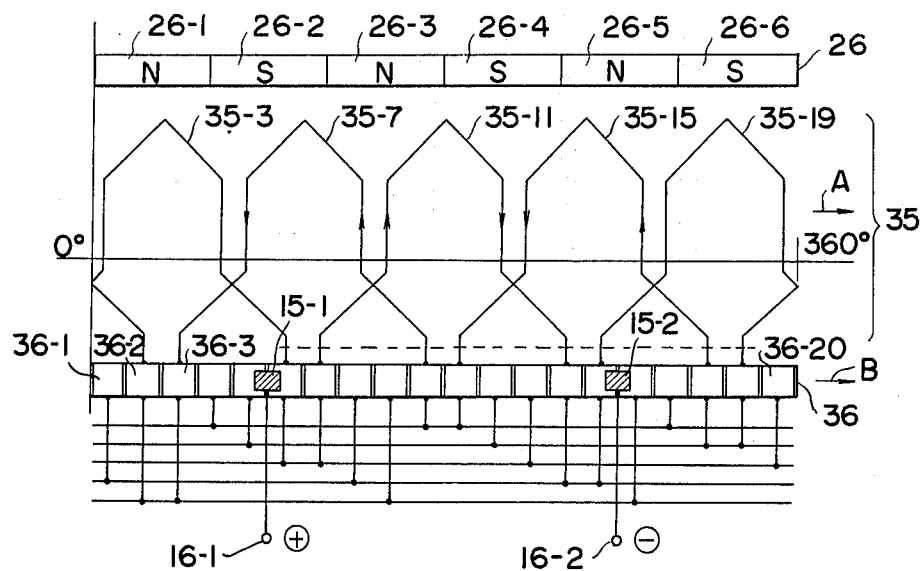

Referring to FIG. 12, there is shown an expanded view of a further embodiment of a DC motor according to the present invention, comprising a field magnet with six magnetic poles and five armature coils. In the armature 35, armature coils 35-3, 35-7, 35-11, 35-15 and 35-19 are integrally molded and arranged with an equal pitch, without being superimposed on each other and with the same degrees angular intervals (6/5 the magnetic pole width) as explained in FIG. 17(d).

The angular intervals of the conductive portions, which conductive portions contribute to the generation of torque, are 60 degrees so as to be substantially equal to the magnetic pole width, corresponding to the armature 7 as shown in FIG. 1.

A commutator 36 which serves as electric power supply control means comprises commutator segments 36-1, 36-2 ..., 36-20, with 18 degrees angular intervals (3/10 the magnetic pole width). The armature 35 is constructed by use of a cross-connected normal wave winding coil comprising 20 conventional armature coils, with the angular intervals of the electrically conductive portion, contributing to the generation of torque in each armature coil, set equal to be the magnetic pole width, which cross-connected normal wave winding coil is short-circuited through a short-circuit means for short-circuiting 15 armature coils (not shown) through the commutator segments which serve as electric power supply control means. Since the cross-connected normal winding coil is the same as that explained by referring to FIG. 11, the detailed explanation thereof is omitted.

In this embodiment of a DC motor according to the present invention, part of the armature 35 is constructed in such a manner that the winding initiation terminals of predetermined armature coils and the winding end terminals of other predetermined coils are short-circuited by a short-circuit member, such as a conductor line, through commutator segments which constitute electric power supply control means, so that part of the armature 35 constitutes a short-circuit means. More specifically, the commutator segments 36-4, 36-10, 36-11, 36-17, the commutator segments 36-5, 36-12, 36-18, 36-19, the commutator segments 36-6, 36-7, 36-13, 36-20, the commutator segments 36-1, 36-8, 36-14, 36-15, the commutator segments 36-2, 36-3, 36-9, 36-16 are each short-circuited.

The angular intervals of brushes 15-1 and 15-2, which serve as electric power supply control means, are the same as explained previously by referring to FIG. 10.

In the configuration shown in FIG. 12, the above-mentioned short-circuiting means and five armature coils, more specifically, the short-circuit member, the armature coil 35-11, the short-circuit member, in the first series and the short-circuit member, the armature coil 35-7 and the short-circuit member in the second series are connected in parallel to the positive and negative poles 16-1 and 16-2 of the DC power source. When current flows in the direction of the arrow, torque is generated in each armature coil, so that the armature 35 and the commutator 36 are respectively rotated in the directions of the arrows A and B and work as commutator motor.

Figure 13:
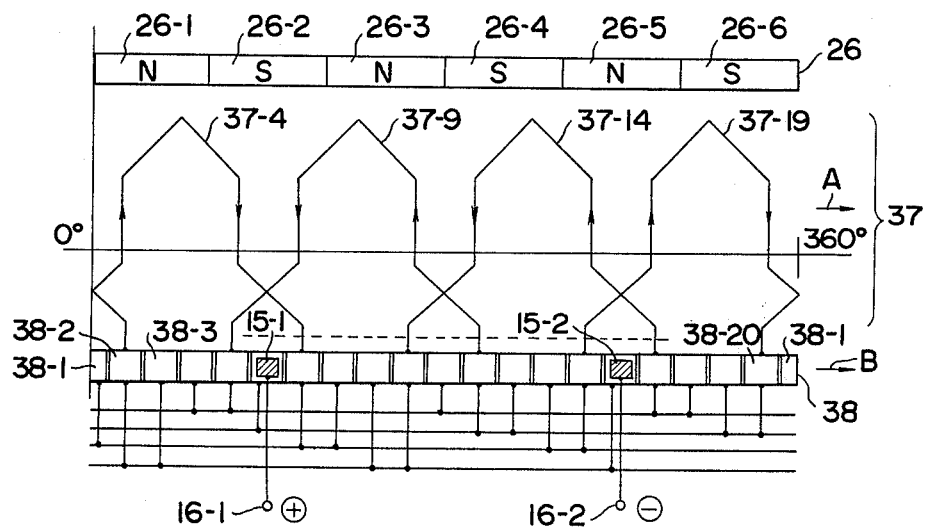

Referring to FIG. 13, there is shown an expanded view of a further embodiment of a DC motor according to the present invention, comprising a field magnet with six magnetic poles and four armature coils. In an armature 37, armature coils 37-4, 37-9, 37-14, and 37-19 are arranged the same angular intervals as previously explained by referring to FIGS. 17 (c) and those armature coils are integrally molded. More specifically, these armature coils are arranged with 90 degrees angular intervals (3/2 the magnetic pole width) and with an equal pitch and without being superimposed on each other.

The angular intervals of the conductive portions, which conductive portions contribute to the generation of torque, are 60 degrees as to be substantially equal to the magnetic pole width, corresponding to the armature 7 as shown in FIG. 1.

A commutator 38 which serves as electric power supply control means comprises commutator segments 38-1, 38-2, ..., 38-20, with 18 degrees angular intervals (3/10 the magnetic pole width). The armature 37 is constructed by use of a cross-connected normal wave winding coil comprising 20 conventional armature coils, with the angular intervals of the electrically conductive portion, contributing to the generation of torque in each armature coil, set equal to the magnetic pole width, which cross-connected normal wave winding coil is short-circuited through a short-circuit means for short-circuiting 16 armature coils (not shown) through the commutator segments which serve as electric power supply control means. Since the cross-connected normal winding coil is the same as that explained by referring to FIG. 11, the detailed explanation thereof is omitted.

In this embodiment of a DC motor according to the present invention, part of the armature 37 is constructed in such a manner that the winding initiation terminals of predetermined armature coils and the winding end terminals of other predetermined coils are short-circuited by a short-circuit member, such as a conductor line, through commutator segments which constitute electric power supply control means, so that part of the armature 37 constitutes a short-circuit means. More specifically, the commutator segments 38-4, 38-5, 38-11, 38-17 and 38-18, the commutator segments 38-6, 38-12, 38-13, 38-19 and 38-20, the commutator segments 38-1, 38-7, 38-8, 38-14 and 38-15, and the commutator segments 38-2, 38-3, 38-9, 38-10 and 38-6 are respectively short-circuited.

The angular intervals of brushes 15-1 and 15-2, which serve as electric power supply control means, are the same as explained previously by referring to FIG. 10.

In the configuration shown in FIG. 13, the above-mentioned short-circuiting means and four armature coils, more specifically, the short-circuit member, the armature coil 37-9, the short-circuit member, the armature coil 37-14, and the short-circuit member in the first series and the short-circuit member, the armature coil 37-4, the short-circuit member, the armature coil 37-19 and the short-circuit member in the second series are connected in parallel to the positive and negative poles 16-1 and 16-2 of the DC power source. When current flows in the direction of the arrow, torque is generated in each armature coil, so that the armature 37 and the commutator 38 are respectively rotated in the directions of the arrows A and B and work as commutator motor.

Figure 14:
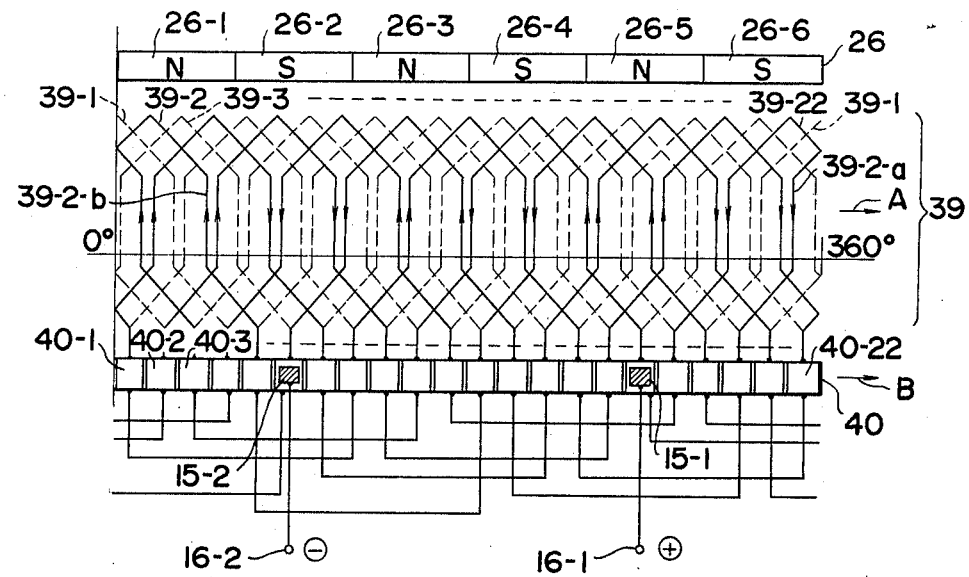

Referring to FIG. 14, there is shown an expanded view of a further embodiment of a DC motor according to the present invention, comprising a field magnet with 6 magnetic poles and 11 armature coils. In an armature 39, armature coils 39-2, 39-4, 39-6, 39-8, 39-10, 39-12, 39-14, 39-16, 39-18, 39-20 and 39-22 are arranged as shown in FIG. 17 (f) and those armature coils are integrally molded. More specifically, those armature coils are arranged, partly overlapping on each other, with an equal pitch and with about 32.7 degrees angular intervals (6/11 the magnetic pole width). The angular intervals of the conductive portions (in the armature coil 39-2, its conductive portions are portions 39-2-a and 39-2-b), which conductive portions contribute to the generation of torque, are 60 degrees so as to be substantially equal to the magnetic pole width, corresponding to the armature 7 as shown in FIG. 1.

Referring back to FIG. 14, a commutator 40 which serves as electric power supply control means comprises commutator segments 40-1, 40-2, ..., 40-22, with about 16.4 degrees angular intervals (3/11 the magnetic pole width). The armature 42 is constructed by use of an open-connected normal wave winding coil comprising 22 conventional armature coils, with the angular intervals of the electrically conductive portion, contributing to the generation of torque in each armature coil, set equal to the magnetic pole width, which open-connected normal wave winding coil is short-circuited through a short-circuit means for short-circuiting 11 armature coils as shown by dotted lines in the figure through the commutator segments which serve as electric power supply control means.

This open-connected normal wave winding coil will now be explained in detail.

Twenty-two armature coils 39-1, 39-2, ..., 39-22 are subjected to wave winding connection and the respective connecting portions of the armature coils 39-1 and 39-8, the armature coils 39-8 and 39-15, the armature coils 39-15 and 39-22, the armature coils 39-22 and 39-7, the armature coils 39-7 and 39-14, the armature coils 39-14 and 39-21, the armature coils 39-21 and 39-6, the armature coils 39-6 and 39-13, the armature coils 39-13 and 39-20, the armature coils 39-20 and 39-5, the armature coils 39-5 and 39-12, the armature coils 39-12 and 39-19, the armature coils 39-19 and 39-4, the armature coils 39-4 and 39-11, the armature coils 39-11 and 39-18, the armature coils 39-18 and 39-3, the armature coils 39-3 and 39-10, the armature coils 39-10 and 39-17, the armature coils 34-17 and 39-2, the armature coils 39-2 and 39-9, the armature coils 39-9 and 39-16, and of the armature coils 39-16 and 39-1 are connected to the commutator segments 40-4, 40-11, 40-18, 40-3, 40-10, 40-17, 40-2, 40-9, 40-16, 40-1, 40-8, 40-15, 40-22, 40-7, 40-14, 40-21, 40-6, 40-13, 40-20, 40-5, 40-12 and 40-19.

In this embodiment of a DC motor according to the present invention, part of the armature 39 is constructed in such a manner that the winding initiation terminals of predetermined armature coils and the winding end terminals of other predetermined coils are short circuited by a short-circuit member, such as a conductor line, through commutator segments which constitute electric power supply control means, so that part of the armature 39 constitutes a short-circuit means. More specifically, the commutator segments 40-4 and 40-19, the commutator segments 40-18 and 40-11, the commutator segments 40-10 and 40-3, the commutator segments 40-2 and 40-17, the commutator segments 40-16 and 40-9, the commutator segments 40-8 and 40-1, the commutator segments 40-22 and 40-15, the commutator segments 40-14 and 40-7, the commutator segments 40-6 and 40-21, the commutator segments 40-20 and 40-13, and the commutator segments 40-12 and 40-5 are short-circuited.

The angular intervals of brushes 15-1 and 15-2, which serve as electric power supply control means, are the same as explained previously by referring to FIG. 10.

In the configuration shown in FIG. 14, the above-mentioned short-circuiting means and 11 armature coils, more specifically, the armature coil 39-14, the short-circuit member, the armature coil 39-22, the short-circuit member, the armature coil 39-8, the short-circuit member, the armature coil 39-16, the short-circuit member, the armature coil 39-2, the short-circuit member, and the armature coil 39-10 in the first series and the short-circuit member, the armature coil 39-6, the short-circuit member, the armature coil 39-20, the short-circuit member, the armature coil 39-12, the short-circuit member, the armature coil 39-4, the short-circuit member, the armature coil 39-18, and the short-circuit member in the second series and connected in parallel to the positive and negative poles 16-1 and 16-2 of the DC power source. When current flows in the direction of the arrow, torque is generated in each armature coil, so that the armature 39 and the commutator 40 are respectively rotated in the directions of the arrows A and B and work as commutator motor.

Referring to FIG. 15, there is shown an expanded view of a further embodiment of a DC motor according to the present invention, comprising a field magnet with six magnetic poles and five armature coils. In the armature 41, armature coils 41-3, 41-8, 41-13, 41-18 and 41-23 are integrally molded and arranged with an equal pitch, without being superimposed on each other and with the same degrees angular intervals (6/5 the magnetic pole width) as explained in FIG. 17(d).

The angular intervals of the conductive portions, which conductive portions contribute to the generation of torque, are 60 degrees so as to be substantially equal to the magnetic pole width, corresponding to the armature 7 as shown in FIG. 1.

A commutator 42 which serves as electric power supply control means comprises commutator segments 42-1, 42-2 ..., 42-25, with 14.4 degrees angular intervals (6/25 the magnetic pole width). The armature 41 is constructed by use of an open-connected normal wave winding coil comprising 20 conventional armature coils, with the angular intervals of the electrically conductive portion, contributing to the generation of torque in each armature coil, set equal to be the magnetic pole width, which open-connected normal wave winding coil is short-circuited through a short-circuit means for short-circuiting 20 armature coils as shown by dotted lines in the figure through the commutator segments which serve as electric power supply control means.

The open-connected normal wave winding coil will now be explained in detail.

Twenty-five armature coils 41-1, 42-2, ..., 42-25 are subjected to wave winding connection and the respective connecting portions of the armature coils 41-1 and 41-9, the armature coils 41-9 and 41-17, the armature coils 41-17 and 41-25, the armature coils 41-25 and 41-8, the armature coils 41-8 and 41-16, the armature coils 41-16 and 41-24, the armature coils 41-24 and 41-7, the armature coils 41-7 and 41-15, the armature coils 41-15 and 41-23, the armature coils 41-23 and 41-6, the armature coils 41-6 and 41-14, the armature coils 41-14 and 41-22, the armature coils 41-22 and 41-5, the armature coils 41-5 and 41-13, the armature coils 41-13 and 41-21, the armature coils 41-21 and 41-4, the armature coils 41-4 and 41-12, the armature coils 41-12 and 41-20, the armature coils 41-20 and 41-3, the armature coils 41-3 and 41-11, the armature coils 41-11 and 41-19, the armature coils 41-19 and 41-2, the armature coils 41-2 and 41-10, the armature coils 41-10 and 41-18, and of the armature coils 41-18 and 41-1 are connected to commutator segments 42-5, 42-13, 42-21, 42-4, 42-12, 42-20, 42-3, 42-11, 42-19, 42-2, 42-10, 42-18, 42-1, 42-9, 42-17, 42-25, 42-8, 42-16, 42-24, 42-7, 42-15, 42-23, 42-6, 42-14 and 42-22.

In this embodiment of a DC motor according to the present invention, part of the armature 41 is constructed in such a manner that the winding initiation terminals of predetermined armature coils and the winding end terminals of other predetermined coils are short-circuited by a short-circuit member, such as a conductor line, through commutator segments which constitute electric power supply control means, so that part of the armature 41 constitutes a short-circuit means. More specifically, the commutator segments 42-22, 42-5, 42-13, 42-21 and 42-4, the commutator segments 42-12, 42-20, 42-3, 42-11 and 42-19, the commutator segments 42-2, 42-10, 42-18, 42-1 and 42-9, the commutator segments 42-17, 42-25, 42-8, 42-16 and 42-24, the commutator segments 42-7, 42-15, 42-23, 42-6 and 42-19 are each short-circuited.

The angular intervals of brushes 15-1 and 15-2, which serve as electric power supply control means, are the same as explained previously by referring to FIG. 10.

In the configuration shown in FIG. 15, the above-mentioned short-circuiting means and five armature coils, more specifically, the short-circuit member, the armature coil 41-8 the short-circuit member, the armature coil 41-18, and the short-circuit member in the first series and the armature coil 41-23, the short-circuit member, the armature coil 41-13, the short-circuit member, and the armature coil 41-3 in the second series are connected in parallel to the positive and negative poles 16-1 and 16-2 of the DC power source. When current flows in the direction of the arrow, torque is generated in each armature coil, so that the armature 41 and the commutator 42 are respectively rotated in the directions of the arrows A and B and work as commutator motor.

Referring to FIG. 16, there is shown an expanded view of a further embodiment of a DC motor according to the present invention, comprising a field magnet with 6 magnetic poles and 13 armature coils. In an armature 43, armature coils 43-2, 43-4, 43-6, 43-8, 43-10, 43-12, 43-14, 43-16, 43-18, 43-20. 43-22, 43-24 and 43-26 are arranged as shown in FIG. 17 (g) and those armature coils are integrally molded. More specifically, these armature coils are arranged partly overlapping on each other, with about 27.7 degrees angular intervals (6/13 the magnetic pole width) and with an equal pitch.

The angular intervals of the conductive portions, which conductive portions contribute to the generation of torque, are 60 degrees as to be substantially equal to the magnetic pole width, corresponding to the armature 7 as shown in FIG. 1.

Referring back to FIG. 16 a commutator 44 which serves as electric power supply control means comprises commutator segments 44-1, 44-2, ..., 44-20, with 13.8 degrees angular intervals (3/13 the magnetic pole width). The armature 43 is constructed of a cross-sectional normal wave winding coil comprising 26 conventional armature coils with the angular intervals of the electrically conductive portion contributing to the generation of torque of each armature coil set equal to the magnetic pole width, which cross-sectional normal wave winding coil is short-circuited through a short-circuited means for short-circuiting 13 armature coils as shown by dotted lines in the figure through the commutator segments which serve as electric power supply control means.

The cross-connected normal wave winding coil will now be explained in detail.

Twenty-six armature coils 41-1, 43-2, ..., 43-26 are subjected to wave winding connection and the respective connecting portions of the armature coils 43-1 and 43-10, the armature coils 43-10 and 43-19, the armature coils 43-19 and 43-2, the armature coils 43-2 and 43-11, the armature coils 43-11 and 43-20, the armature coils 43-20 and 43-3, the armature coils 43-3 and 43-12, the armature coils 43-12 and 43-21, the armature coils 43-21 and 43-4, the armature coils 43-4 and 43-13, the armature coils 43-13 and 43-22, the armature coils 43-22 and 43-5, the armature coils 43-5 and 43-14, the armature coils 43-14 and 43-23, the armature coils 43-23 and 43-6, the armature coils 43-6 and 43-15, the armature coils 43-15 and 43-24, the armature coils 43-24 and 43-7, the armature coils 43-7 and 43-16, the armature coils 43-16 and 43-25, the armature coils 43-25 and 43-8, the armature coils 43-8 and 43-17, the armature coils 43-17 and 43-26, the armature coils 43-26 and 43-9, the armature coils 43-9 and 43-18, and of the armature coils 43-18 and 43-1 are connected to the commutator segments of 44-5, 44-14, 44-23, 44-6, 44-15, 44-24, 44-7, 44-16, 44-25, 44-8, 44-17, 44-26, 44-9, 44-18, 44-1, 44-10, 44-19, 44-2, 44-11, 44-20, 44-3, 44-12, 44-21, 44-4, 44-13 and 44-22.

In this embodiment of a DC motor according to the present invention, part of the armature 43 is constructed in such a manner that the winding initiation terminals of predetermined armature coils and the winding end terminals of other predetermined coils are short circuited by a short-circuit member, such as a conductor line, through commutator segments which constitute electric power supply control means, so that part of the armature 43 constitutes a short-circuit means. More specifically, the commutator segments 44-5 and 44-22, the commutator segments 44-23 and 44-14, the commutator segments 44-15 and 44-6, the commutator segments 44-7 and 44-24, the commutator segments 44-25 and 44-16, the commutator segments 44-17 and 44-8, the commutator segments 44-9 and 44-26, the commutator segments 44-1 and 44-18, the commutator segments 44-19 and 44-10, the commutator segments 44-11 and 44-2, the commutator segments 44-3 and 44-20, the commutator segments 44-21 and 44-12, and the commutator segments 44-13 and 44-4 are short-circuited.

The angular intervals of brushes 15-1 and 15-2, which serve as electric power supply control means, are the same as explained previously by referring to FIG. 10.

In the configuration shown in FIG. 16, the above-mentioned short-circuiting means and 13 armature coil, more specifically, the short-circuit member, the armature coil 43-20, the short-circuit member, the armature coil 43-2, the short-circuit member, the armature coil 43-10, the short-circuit member the armature coil 43-18, the short-circuit member, the armature coil 43-26, the short-circuit member, the armature coil 43-8 and the short-circuit member in the first series and the armature coil 43-12, the short-circuit member, the armature coil 43-4, the short-circuit member, the armature coil 43-22, the short-circuit member, the armature coil 43-14, the short-circuit member, the armature coil 43-6, the short-circuit member, the armature coil 43-24, the short-circuit member and the armature coil 43-16 in the second series and connected in parallel to the positive and negative poles 16-1 and 16-2 of the DC power source. When current flows in the direction of the arrow torque is generated in each armature coil, so that the armature 43 and the commutator 44 are respectively rotated in the directions of the arrows A and B and work as commutator motor.

Figure 20B:
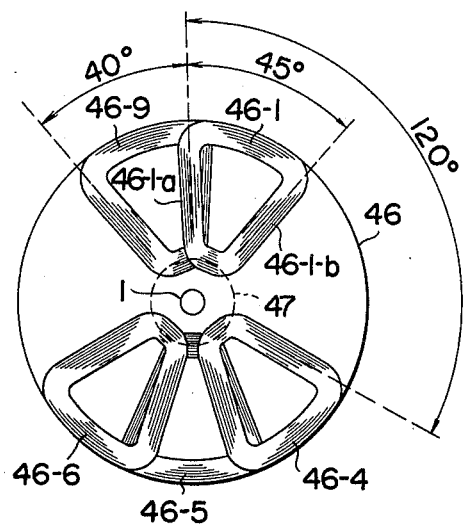

Referring to FIG. 18, there is shown an expanded view of a further embodiment of a DC motor according to the present invention, comprising a field magnet with 8 magnetic poles (n=4, 2n=8) and 5 armature coils. In an armature 46, armature coils 46-1, 46-4, 46-5 and 46-9 are arranged as shown in FIG. 20(b) and those armature coils are integrally molded. More specifically, the armature coils 46-1 and 46-4 and the armature coils 46-6 and 46-9 are arranged with about 120 degrees angular intervals (8/3 the magnetic pole width), while the armature coils 46-4 and 46-5, the armature coils 46-5 and 46-6, and the armature coils 46-9 and 46-1 are arranged with about 40 degrees angular intervals (8/9 the magnetic pole width), partly overlapping on each other. The angular intervals of the conductive portions (in the armature coils 46-1, its conductive portions are portions 46-1-a and 46-1-b), which conductive portions contribute to the generation of torque, are 45 degrees so as to be substantially equal to the magnetic pole width, corresponding to the armature 7 as shown in FIG. 1.

Referring back to FIG. 18, a commutator 47 which serves as electric power supply control means comprises commutator segments 47-1, 47-2, ..., 47-9, with 40 degrees angular intervals (8/9 the magnetic pole width). The armature 46 is constructed by use of an open-connected normal wave winding coil comprising 9 conventional armature coils, with the angular intervals of the electrically conductive portion, contributing to the generation of torque in each armature coil, set equal to the magnetic pole width, which open-connected normal wave winding coil is short-circuited through a short-circuit means for short-circuiting 4 armature coils as shown by dotted lines in the figure through the commutator segments which serve as electric power supply control means.

This open-connected normal wave winding coil will now be explained in detail.

Nine armature coils 46-1, 46-2, ..., 46-9 are subjected to wave winding connection and the respective connecting portions of the armature coils 46-1 and 46-3, the armature coils 46-3 and 46-5, the armature coils 46-5 and 46-7, the armature coils 46-7 and 46-9, the armature coils 46-9 and 46-2, the armature coils 46-2 and 46-4, the armature coils 46-4 and 46-6, the armature coils 46-6 and 46-8, and of the armature coils 46-8 and 46-1 are connected to commutator segments 47-2, 47-4, 47-6, 47-8, 47-1, 47-3, 47-5, 47-7 and 47-9.

In this embodiment of a DC motor according to the present invention, part of the armature 46 is constructed in such a manner that the winding initiation terminals of predetermined armature coils and the winding termination terminals of other predetermined armature coils are short-circuited by a short-circuit member, such as a conductor line, through commutator segments which constitute electric power supply control means, so that part of the armature 46 constitutes a short-circuit means. More specifically, the commutator segments 47-4 to which the winding initiation terminal of the armature coil 46-5 is connected is short-circuited with the commutator segments 47-2 to which the winding end terminal of the armature coil 47-1 is connected. Likewise, the commutator segment 47-8 to which the winding initiation terminal of the armature coil 46-9 is connected is short-circuited with the commutator segment 47-6 to which the winding end terminal of the armature coil 46-5 is connected. Further, the commutator segment 47-3 to which the winding initiation terminal of the armature coil 47-1 is connected is short-circuited with the commutator segment 47-1 to which the winding end terminal of the armature coil 46-9 is connected. The commutator segment 47-9 to which the winding initiation terminal of the armature coil 46-1 is connected is short-circuited with the commutator segment 47-7 to which the winding end terminal of the armature coil 46-6 is connected.

The angular intervals of brushes 15-1 and 15-2, which serve as electric power supply control means, are 135 degrees (three times the magnetic pole width).

In this embodiment, 225 degrees angular intervals (five times the magnetic pole width) are equivalent to the 135 degrees angular intervals and therefore can be adopted.

However, neither 45 degrees angular intervals (three times the magnetic pole width) nor 315 degrees angular intervals (five times the magnetic pole width) cannot be adopted since the brushes are short-circuited at those angular intervals.

In the configuration shown in FIG. 18, the above-mentioned short-circuiting means and 5 armature coils, more specifically, the short-circuit member, the armature coil 46-9, the short-circuit member, the armature coil 46-5 and the short-circuit member, the short-circuit member and the armature coil 46-1 in the first series and the armature coils 46-4 and 46-6 in the second series are connected in parallel to the positive and negative poles 16-1 and 16-2 of the DC power source. When current flows in the direction of the arrow, torque is generated in each armature coil, so that the armature 46 and the commutator 47 are respectively rotated in the directions of the arrows A and B and work as commutator motor.

Figure 20C:
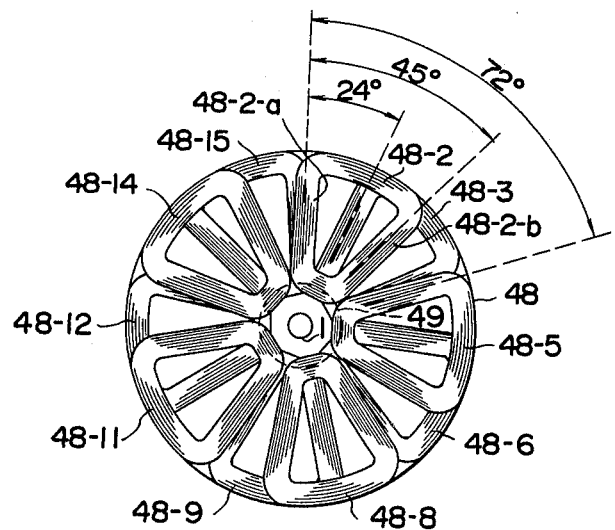

Referring to FIG. 19, there is shown an expanded view of a further embodiment of a DC motor according to the present invention, comprising a field magnet with 8 magnetic poles and 10 armature coils. In the armature 48, armature coils 48-2, 48-3, 48-5, 48-6, 48-8, 46-9, 48-11, 48-12, 48-14 and 48-15 are arranged as shown in FIG. 20(c) and those armature coils are integrally molded.

Specifically, the armature coils 48-2, 48-5, 48-8, 48-11, and 48-14 are arranged with 72 degrees angular intervals (8/5 the magnetic pole width) and with an equal pitch on the upper surface of a disc-shaped armature. The angular intervals of the conductive portions (in the case of the armature coils 48-2, its conductive portions are portions 48-2a and 48-2b), which conductive portions contribute to the generation of torque, are 45 degrees so as to be substantially equal to the magnetic pole width. The five armature coils are positioned side by side. The armature coils 48-3, 48-6, 48-9, 48-12 and 48-15 are arranged side by side on the lower surface of the disc-shaped armature with the same angular intervals as mentioned above. The upper armature coils and the lower armature coils are double layered with a phase shift of 24 degrees (8/15 the magnetic pole width), forming a disc-shaped armature, which corresponds to the armature 7 as shown in FIG. 1.

Referring back to FIG. 19, a commutator 49 which serves as electric power supply control means comprises commutator segments 49-1, 49-2, ..., 49-15, with 24 degrees angular intervals (8/15 the magnetic pole width). The armature 48 is constructed of a cross-connected normal wave winding coil comprising 15 conventional armature coils with the angular intervals of the electrically conductive portion contributing to the generation of torque in each armature coil set equal to the magnetic pole width, which cross-connected normal wave winding coil is short-circuited through a short-circuit means for short-circuiting five armature coils as shown by dotted lines in the figure through the commutator segments which serve as electric power supply control means.

The cross-connected normal wave winding coil will now be explained in detail.

Fifteen armature coils, 48-1, 48-2 ..., 48-15 are subjected to wave winding connection and the respective connecting portions of the armature coils 48-1 and 48-5, the armature coils, 48-5 and 48-9 the armature coils, 48-9 and 48-13 the armature coils, 48-13 and 48-2 the armature coils 48-2 and 48-6, the armature coils 48-6 and 48-10, the armature coils 48-10 and 48-14, the armature coils 48-14 and 48-3, the armature coils, 48-3 and 48-7 the armature coils 48-7 and 48-11 the armature coils 48-11 and 48-15, the armature coils 48-15 and 48-4, the armature coils 48-4 and 48-8, the armature coils 48-8 and 48-12, the armature coils 48-12 and 48-1, are connected to commutator segments 49-3, 49-7, 49-11, 49-15, 49-4, 49-8, 48-12, 49-1, 49-5, 49-9, 49-13, 49-2, 49-6 and 49-10.

In this embodiment of a DC motor according to the present invention, part of the armature 48 is constructed in such a maner that the winding initiation terminals of predetermined armature coils and the winding end terminals of other predetermined coils are short-circuited by a short-circuit member, such as a conductor line, through commutator segments which constitute electric power supply control means, so that part of the armature 48 constitutes a short-circuit means.

Specifically, the commutator segment 49-3 to which the winding initiation terminal of the armature coil 48-5 is connected is short-circuited with the commutator segment 49-14 to which the winding termination terminal of the armature coil 48-12 is connected. Likewise, the commutator segment 49-15 to which the winding initiation terminal of the armature coil 48-2 is connected is short-circuited with the commutator segment 49-11 to which the winding end terminal of the armature coil 48-9 is connected. Further, the commutator segment 49-12 to which the winding initiation terminal of the armature coil 48-14 is connected is short-circuited with the commutator segment 49-8 to which the winding end terminal of the armature coil 48-6 is connected. The commutator segment 49-9 to which the winding initiation terminal of the armature coil 48-11 is connected is short-circuited with the commutator segment 49-5 to which the winding end terminal of the armature coil 48-3 is connected. Further, the commutator segment 49-6 to which the winding initiation terminal of the armature coil 48-8 is connected is short-circuited with the commutator segment 49-2 to which the winding end terminal of the armature coil 48-15 is connected.

The angular intervals of brushes 15-1 and 15-2, which serve as electric power supply control means, are 45 degrees (three times the magnetic pole width).

In this embodiment, 45 degrees angular intervals (the same as the magnetic pole width) and 225 degrees angular intervals (five times the magnetic pole width), and 315 degrees angular intervals (seven times the magnetic pole width) are substantially equivalent to 135 degrees and can be adopted.

In the configuration shown in FIG. 19, the above-mentioned short-circuiting means and ten armature coils, more specifically, the armature coils 48-9 and 48-5, the short-circuit member, the armature coils 48-12 and 48-8 in the first series, and the armature coil 48-14 and 48-3 in the second series are connected in parallel to the positive and negative poles 16-1 and 16-2 of the DC power source. When current flows in the direction of the arrow, torque is generated in each armature coil, so that the armature 48 and the commutator 49 are respectively rotated in the directions of the arrow A and B and work as commutator motor.

Figure 21:
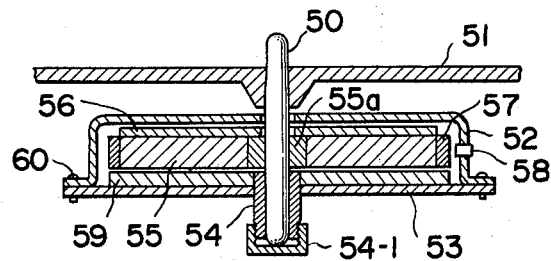
FIG. 21 is a cross-sectional view of a semiconductor motor to which the present invention is applied.

Referring to FIG. 21, there is shown a cross-sectional view of a semiconductor motor provided with a disc-shaped armature. In the figure, a bearing 54 is fixed to a casing 53 made of press-formed soft steel. Further, a casing 52 made of press-formed soft steel is secured to the casing 53 by screws 60. A rotating shaft 50 for supporting a turntable 51 is rotatably supported by the bearing 54. To the rotating shaft 50 is fixed a magnet rotor 55 through a magnet holder 55a. Around the peripheral surface of the magnet rotor 55, there is fixed a ring-shaped position sensing indication band 57. The magnet rotor 55, which serves as field magnet, is magnetized with magnetic poles N and S located in the axial direction of the rotating shaft 50. A disc member 56 made of soft steel, forming a magnetic circuit, is attached to the upper surface of the magnet rotor 55. An armature 59 is attached to the inner surface of the casing 53. Reference numeral 58 indicates a support member for a position sensor, which support member is held in a vacant portion formed in the casing 52. In an outer peripheral lower portion of the bearing 54, there is formed a screw portion in which the rotating shaft 50 is screwed through an internal thread 54-1, so that the position of the rotating shaft 50 can be adjusted in the thrust direction.

Figure 22:
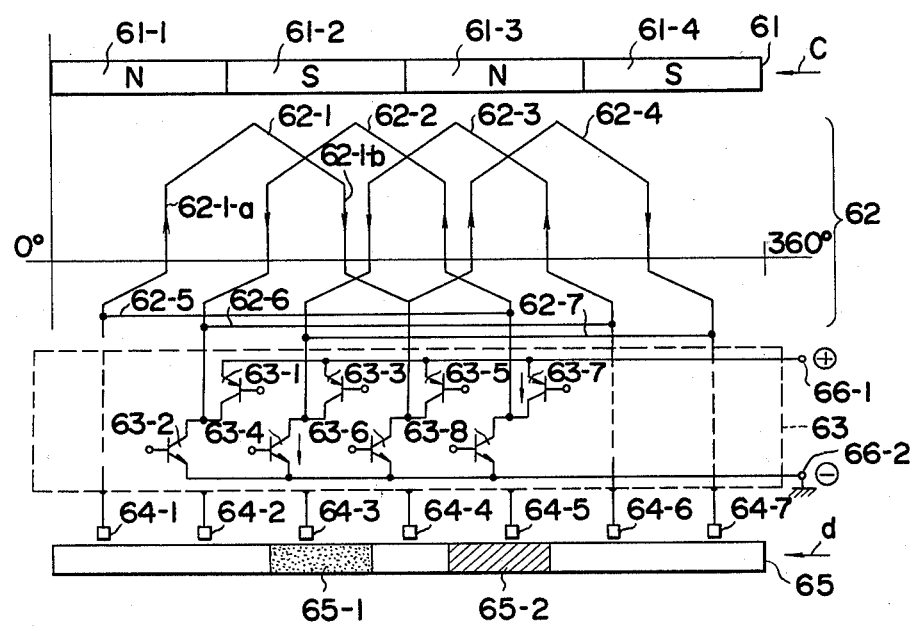
FIG. 22 is an expanded view of the armature coil, magnet rotor of the semiconductor motor as shown in FIG. 21.

Referring to FIG. 22, a semiconductor motor provided with the above-described disc-shaped armature, to which the present invention is applied, will now be explained.

A magnet rotor 61, which serves as a field magnet, includes magnetic poles 61-1, 61-2, 61-3 and 61-4, magnetized to N and S with angular intervals of 90 degrees in the axial direction of the rotating shaft, as shown in FIG. 7(a). The magnet rotor 61 is rotated in the direction of the arrow C, which magnet rotor 61 corresponds to the magnet rotor 55 as shown in FIG. 21.

In an armature 62, armature coils 62-1, 62-2, 62-3 and 62-4 are arranged in exactly the same manner as the armature coils 13-3, 13-4, 13-5 and 13-6 as shown in FIG. 7(b). Specifically, the armature coils 62-1 and 62-2, the armature coils 62-2 and 62-3, and the armature coils 62-3 and 62-4 are arranged with about 51.4 degrees angular intervals (4/7 the magnetic pole width), while the armature coils 62-4 and 62-1 are arranged with about 205.7 degrees angular intervals (16/7 the magnetic pole width), partly overlapping on each other, whereby the armature 62 is constructed.

The angular intervals of the electrically conductive portions (in the case of the armature coil 62-1, its conductive portions are portions 62-1-a and 62-1-b), contributing to the generation of torque in each armature coil, are 90 degrees so as to be substantially equal to the magnetic pole width, corresponding to the armature 53 as shown in FIG. 21.

These armature coils are connected in series with each other as shown in FIG. 22 and connected to a positive pole 66-1 and a negative pole 66-2 of a DC power source through an electric power supply control circuit 63, which serves as electric power supply control means. More specifically, the connecting portions of the winding end terminals of the armature coil 62-1 and the winding initiation terminal of the armature coil 62-4 are connected to the collector of transistors 63-5 and 63-6, which collector serves as a semiconductor switching device. The connecting portions of the winding end terminal of the armature coil 62-4 and the winding initiation terminal of the armature coil 62-3 are connected to the collector of transistors 63-3 and 63-4. The connecting portions of the winding end terminal of the armature coil 62-3 and the winding initiation terminal of the armature coil 62-2 are connected to the collector of the transistors 63-1 and 63-2. The connecting portions of the winding end terminal of the armature coil 62-2 and the winding initiation terminal of the armature coil 62-1 are connected to the collector of the transistors 63-7 and 63-8. The emitters of the transistors 63-1, 63-3, 63-5 and 63-7 are connected to the positive pole 66-1 of the DC power source, while the emitters of the transistors 63-2, 63-4, 63-6 and 63-8 are connected to the negative pole 66-2 of the DC power source. Reference numerals 64-1, 64-2, . . . , 64-7 indicate position sensor. As the position sensors, for instance, Hall devices, induction coils or the like can be employed. The angular intervals of the position sensors are about 51.4 degrees, corresponding to the 4/7 the magnetic pole width. The position sensors 64-1, 64-2, . . . , 64-7 are held in the support member 58 as shown in FIG. 21 and are directed towards the position sensing indication band 57.

Reference numeral 65 indicates a position sensing indication member including an S pole shown by a dotted portion 65-1 and with an N pole shown by a shaded portion 65-2 and the angular intervals thereof are about 51.4 degrees (4/7 the magnetic pole width), which position sensing indication member 65 corresponds to the position sensing indication band 57 as shown in FIG. 21.

When Hall devices are employed as position sensors, the position sensing indication member 65 (or the position sensing indication band 57) can be removed and the outward leaked magnetic flux of the magnetic poles 61-1, 61-2, 61-3 and 61-4 of the magnet rotor 61 can be utilized. In this case, it is necessary that, in the portion directed to the Hall devices 64-1, 64-2, . . . , 64-7, the angular intervals of the S pole 61-2 and the N pole 61-3 be about 51.4 degrees (4/7 the magnetic pole width). In other portions, the magnetic shield should be made by use of a magnetic material, such as soft steel. Furthermore, the Hall devices can be placed side by side on the surface of the armature 59 as shown in FIG. 21.

The position sensors are connected in such a manner that their counterpart transistors included in the electric power supply control circuit 63 are made conductive when those position sensors face to the N and S poles.

Specifically, when the position sensors elements 64-1 and 64-5 face to the N pole, the transistor 63-7 is made conductive by the output of the position sensors 64-1 and 64-5, while when the position sensors 64-1 and 64-5 face to the S pole, the transistor 63-8 is made conductive by the output of the same.

Likewise, when the position sensors 64-2 and 64-6 face to the N pole, the transistor 63-1 is made conductive by the output of the position sensors 64-2 and 64-6, while when the the position sensors 64-2 and 64-6 face to the S pole, the transistor 63-2 is made conductive by the output of the same.

When the position sensors 64-3 and 64-7 face to the N pole, the transistor 63-3 is made conductive by the output of the position sensors 64-3 and 64-7, while when the position sensors 64-3 and 64-7 face to the S pole, the transistor 63-4 is made conductive by the output of the same.

When the position sensors 64-4 faces to the N pole, the transistor 63-5 is made conductive by the output of the position sensor 64-4, while when the position sensor 64-4 faces to the S pole, the transistor 63-6 is made conductive by the output of the same.

When one of the transistors 63-1, 63-3, 63-5 and 63-7 is made conductive, the positive pole 66-1 of the DC power source and the armature coils are made conductive, while when one of the transistors 63-2, 63-4, 63-6 and 63-8 is made conductive, the negative pole 66-2 of the DC power source and the armature coils are made conductive and by such conduction, the armature current is controlled.

In the configuration as shown in FIG. 22, by the output of the Hall device 64-5 which faces the N pole, its counterpart transistor 63-7 is made conductive, so that the connecting portions of the positive pole 66-1 of the DC power source and of the armature coils 62-2 and 62-1 are made conductive.

Furthermore, by the output of the Hall device 64-3 facing the S pole, its counterpart transistor 64-3 is made conductive, so that the connecting portions of the negative pole 66-2 of the DC power source and of the the armature coils 62-4 and 62-3 are made conductive. As a result, electric current flows in the direction of the arrow and torque is generated in each of the armature coil, so that the magnet rotor 61 and the position sensing indication band 65 are respectively rotated in the direction of the arrows c and d. Thus, switching of the armature current (i.e. commutation) is successively performed and accordingly torque for rotation is successively generated.

This power supply method is exactly the same as that in the case of conventional semiconductor motors and the magnet rotor 61 and the position sensing indication band 65 are respectively rotated in the directions of the arrows c and d and work as a semiconductor motor.

In this embodiment, the embodiment of a commutator motor according to the present invention, which has been explained by referring to FIG. 2 is applied to a semiconductor motor. As a matter of course, the other embodiments according to the present invention can be applied to semiconductor motors.

In all the embodiments so far explained, the present invention is applied to the disc-shaped armatures. By its nature, the present invention can be applied to cylindrical armatures and core armatures.

Thus, there is provided in accordance with the invention a DC motor which has the advantage discussed above. The embodiments described are intended to be merely exemplary and those skilled in the art will be able to make variations and modifications in them without departing from the spirit and scope of the invention. All such modification and variations are contemplated as falling within the scope of the claims.

What is claimed is:

1. A direct current motor comprising:
   a field magnet provided with 2n magnetic poles which are magnetized with the same angular intervals as those of the magnetic poles N and S, where n is an integer of 1 or more;
   a magnetic member for closing the magnetic circuit of said magnetic poles of said field magnet;
   a plurality of armature coils disposed in such a manner that the angular intervals of the electrically conductive portions thereof, contributing to the generation of torque in said armature coils, are substantially equal to the magnetic pole width of said field magnet;
   electric power supply control means to which the terminals of said armature coils are connected;
   short-circuit means for short-circuiting the winding intiation terminals of predetermined armature coils directly to other of said terminals, in which at least one terminal is not shorted to any other, and the winding end terminals of other predetermined armature coils through said electric power supply control means;
   an armature comprising armature coils in a first series and armature coils in a second series, through which said short-circuit means and said plurality of armature coils are connected in parallel to the positive pole and negative pole of a DC power source, said armature positioned so as to face said field magnet; and
   a rotating shaft for rotatably supporting said armature or said field magnet as a rotor, said rotating shaft rotatably supported by bearings disposed on an outer casing of said direct current motor.

* * * * *

UNITED STATES PATENT AND TRADEMARK OFFICE
CERTIFICATE OF CORRECTION

PATENT NO. : 4,404,485
DATED : September 13, 1983
INVENTOR(S) : BAN ET AL

It is certified that error appears in the above—identified patent and that said Letters Patent is hereby corrected as shown below:

Col. 3, line 55, after "through" insert --short-circuit--

Col 8, line 23, delete "prdetermined" insert --predetermined--

Col. 13, line 54, delete "23-2" insert --32-2--

Col. 15, line 59, delete "13" insert --33--

Col. 20, lines 54 & 55, delete "cross-sectional" insert --cross-connected--

Signed and Sealed this

Fifteenth Day of May 1984

[SEAL]

Attest:

GERALD J. MOSSINGHOFF

Attesting Officer

Commissioner of Patents and Trademarks